(12) United States Patent
Miyata

(10) Patent No.: US 8,132,217 B2
(45) Date of Patent: Mar. 6, 2012

(54) CONTROL DEVICE, REPRODUCTION SYSTEM, AND PROGRAM

(75) Inventor: Katsuya Miyata, Yokohama (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 540 days.

(21) Appl. No.: 12/275,091

(22) Filed: Nov. 20, 2008

(65) Prior Publication Data

US 2009/0138921 A1　May 28, 2009

(30) Foreign Application Priority Data

Nov. 22, 2007　(JP) ................. 2007-303591

(51) Int. Cl.
*H04N 7/18*　(2006.01)
*H04N 5/932*　(2006.01)
*H04N 5/935*　(2006.01)

(52) U.S. Cl. ............... 725/78; 725/81; 386/216

(58) Field of Classification Search ............ None
See application file for complete search history.

(56) References Cited

U.S. PATENT DOCUMENTS

| | | | |
|---|---|---|---|
| 2006/0253874 A1* | 11/2006 | Stark et al. | 725/62 |
| 2007/0232221 A1 | 10/2007 | Miyata | |
| 2007/0266395 A1* | 11/2007 | Lee et al. | 725/11 |

FOREIGN PATENT DOCUMENTS

| | | |
|---|---|---|
| JP | 2004-86441 | 3/2004 |
| JP | 2004-362437 | 12/2004 |
| JP | 2005-100200 | 4/2005 |
| JP | 2006-246057 | 9/2006 |
| JP | 2006-277276 | 10/2006 |
| JP | 2007-4773 | 1/2007 |

* cited by examiner

*Primary Examiner* — Mark D Featherstone

(74) *Attorney, Agent, or Firm* — Cozen O'Connor

(57) ABSTRACT

First, a control device determines a reproduction-display device, from which the control device has been able to obtain neighborhood device information via a short-range wireless communication section, to be located in the neighborhood of the control device, and registers this reproduction-display device to neighborhood determination information. Next, the control device detects the reproduction-display devices connected to a network, to which a content server is connected, using a network communication section and registers these reproduction-display devices to reproduction device registration information. The reproduction-display device, which is registered in both of the reproduction device registration information and the neighborhood determination information, is designated by priority, and reproduces and displays content.

10 Claims, 18 Drawing Sheets

NEIGHBORHOOD
DETERMINATION INFORMATION          1032

| REPRODUCTION-DISPLAY DEVICE NAME (NNk) | ADDRESS (ANk) |
|---|---|
| TV 1 | IP ADDRESS 1 |
| TV 2 | IP ADDRESS 2 |
| MONITOR 1 | IP ADDRESS 3 |
| ..... | ..... | k:1~K

FIG.3A

REPRODUCTION DEVICE
REGISTRATION INFORMATION          1033

| REPRODUCTION-DISPLAY DEVICE NAME (NDn) | ADDRESS (ADn) |
|---|---|
| TV 1 | IP ADDRESS 1 |
| TV 2 | IP ADDRESS 2 |
| MONITOR 1 | IP ADDRESS 3 |
| TV 3 | IP ADDRESS 4 |
| MONITOR 2 | IP ADDRESS 5 |
| ..... | ..... | n:1~N

FIG.3B

SERVER REGISTRATION INFORMATION 1034

| SERVER NAME (NSm) | SERVER ADDRESS (ASm) |
|---|---|
| HDD RECORDER 1 | 192. 168. 0. 1 |
| HDD RECORDER 2 | 192. 168. 0. 2 |
| VIDEO 1 | 192. 168. 0. 3 |
| ..... | ..... | m : 1~M

FIG.4A

CONTENT REGISTRATION INFORMATION 1035

| CONTENT NAME (NCl) | SERVER NAME (NSm) | RETAINING FOLDER (FLl) |
|---|---|---|
| MOON LIGHT | HDD RECORDER 1 | FOLDER α |
| WEEKLY NEWS | HDD RECORDER 2 | FOLDER β |
| SOCCER | VIDEO 1 | FOLDER γ |
| ..... | ..... | | l : 1~L

FIG.4B

REPRODUCTION DEVICE PLACEMENT INFORMATION 1036A

| REPRODUCTION-DISPLAY DEVICE NAME (NDn) | ADDRESS (ADn) | NEIGHBORHOOD BASE STATION (Bn) |
|---|---|---|
| TV 1 | IP ADDRESS 1 | AP1 |
| TV 2 | IP ADDRESS 2 | AP2 |
| MONITOR 1 | IP ADDRESS 2 | AP3 |
| ..... | ..... | ..... | n : 1 ~ N

FIG.10A

REPRODUCTION DEVICE PLACEMENT INFORMATION 1036B

| REPRODUCTION-DISPLAY DEVICE NAME (NDn) | ADDRESS (ADn) | IN-HOUSE POSITION (Pn) |
|---|---|---|
| TV 1 | IP ADDRESS 1 | LIVING ROOM |
| TV 2 | IP ADDRESS 2 | BEDROOM |
| MONITOR 1 | IP ADDRESS 2 | BATHROOM |
| ..... | ..... | ..... | n : 1 ~ N

FIG.10B

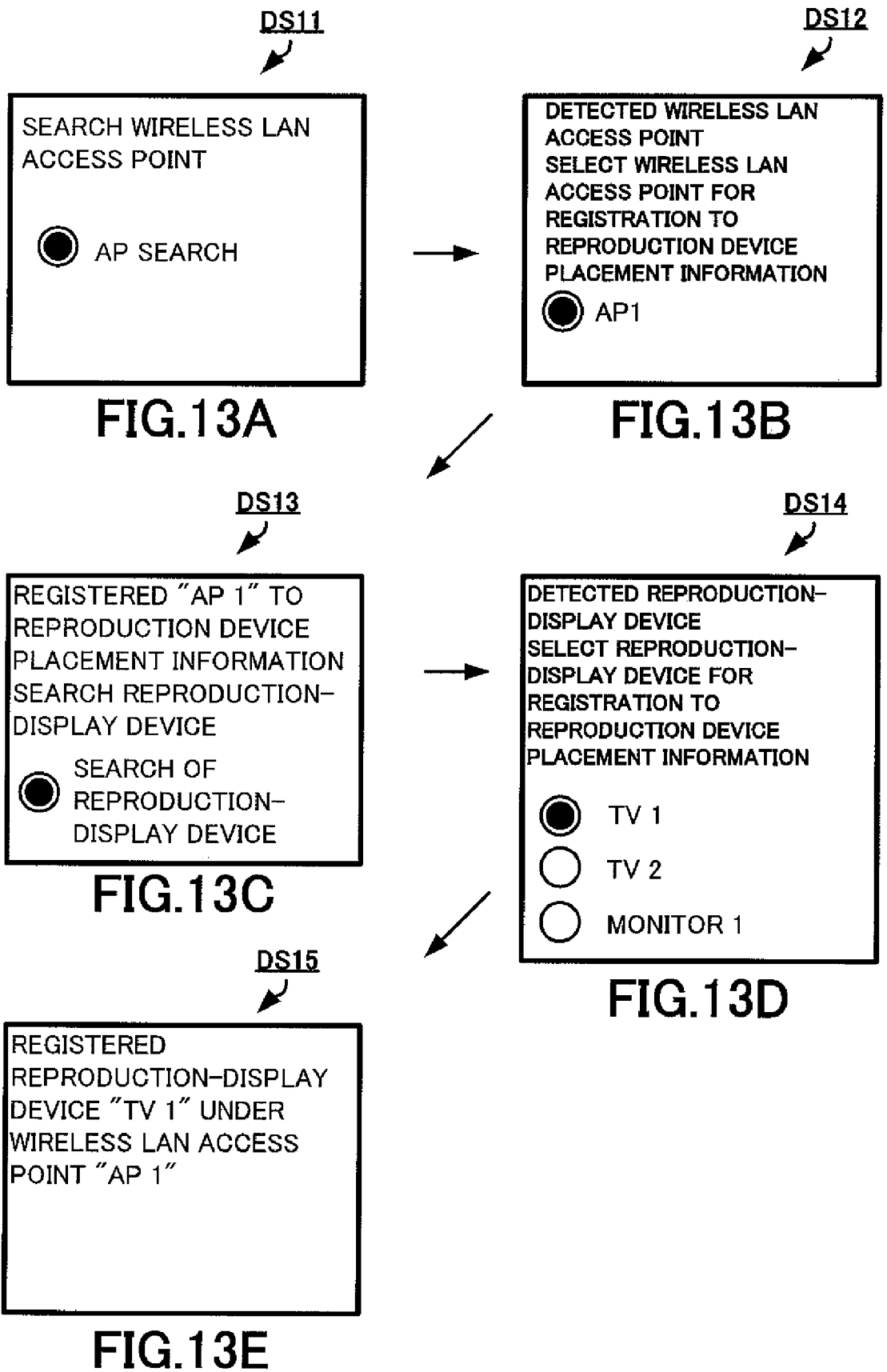

CONTROL DEVICE, REPRODUCTION SYSTEM, AND PROGRAM

BACKGROUND OF THE INVENTION

1. Field of the Invention

The present invention relates to a control device, a reproduction system and a program.

2. Description of the Related Art

Recently, there is a trend of a home network to share content by connecting a TV set, a recorder, a personal computer, etc. in a home with one another via a network. To realize the home network, various standards have been proposed, such as the DLNA (Digital Living Network Alliance) guide line, for example. In such an interconnection system, a user designates a desired reproduction device from among a plurality of reproduction devices connected to the network by operating a control device, when the user reproduces and displays content which is supplied by a content server, as in 3Box which is a use case presumed by the DLNA guide line, for example.

Unexamined Japanese Patent Application KOKAI Publication No. 2007-4773 discloses a content display reproduction method that automatically selects a reproduction device which is selected last time or a reproduction device which has been selected so far the most frequently, according to selection-history information representing a selection history of the reproduction device, for simplifying user's operation in selecting the reproduction devices.

SUMMARY OF THE INVENTION

A control device of the present invention controls a content retaining device retaining content and a plurality of reproduction devices reproducing and displaying the content supplied from the content retaining device via a network, and includes a predetermined-range determination unit determining the reproduction device located in a predetermined range based on the control device, a reproduction device designating unit designating at least one reproduction device from among the reproduction devices which are determined to be located in the predetermined range by the predetermined-range determination unit, and a reproduction instruction unit instructing the reproduction device designated by the reproduction device designating unit to obtain the content retained by the content retaining device via the network and to reproduce and display the content.

Further, the present invention provides a reproduction system including a control device which performs the operation specific to the present invention. Still further, the present invention provides a program causing a computer to execute the substantial functions of the present invention.

According to the present invention, a control device designates a reproduction device which is determined to be located in the neighborhood of the control device from among a plurality of reproduction devices, and instructs the reproduction device to obtain content retained by a content server and to reproduce and display the content.

Thereby, it is possible to select a reproduction device located in the neighborhood of the control device for improving user's convenience, when content is reproduced.

BRIEF DESCRIPTION OF THE DRAWINGS

These objects and other objects and advantages of the present invention will become more apparent upon reading of the following detailed description and the accompanying drawings in which:

FIG. 3A is a diagram showing an example of a data structure of neighborhood determination information;

FIG. 3B is a diagram showing an example of a data structure of reproduction device registration information;

FIG. 4A is a diagram showing an example of a data structure of server registration information;

FIG. 4B is a diagram showing an example of a data structure of content registration information;

FIG. 10A is a diagram showing a first example of a data structure of reproduction device placement information;

FIG. 10B is a diagram showing a second example of a data structure of reproduction device placement information;

FIG. 13A is a diagram showing an example of a first screen displayed when first reproduction device placement information is registered;

FIG. 13B is a diagram showing an example of a second screen displayed when the first reproduction device placement information is registered;

FIG. 13C is a diagram showing an example of a third screen displayed when the first reproduction device placement information is registered;

FIG. 13D is a diagram showing an example of a fourth screen displayed when the first reproduction device placement information is registered;

FIG. 13E is a diagram showing an example of a fifth screen displayed when the first reproduction device placement information is registered;

DETAILED DESCRIPTION OF THE PREFERRED EMBODIMENTS

First Embodiment

Figure 1:
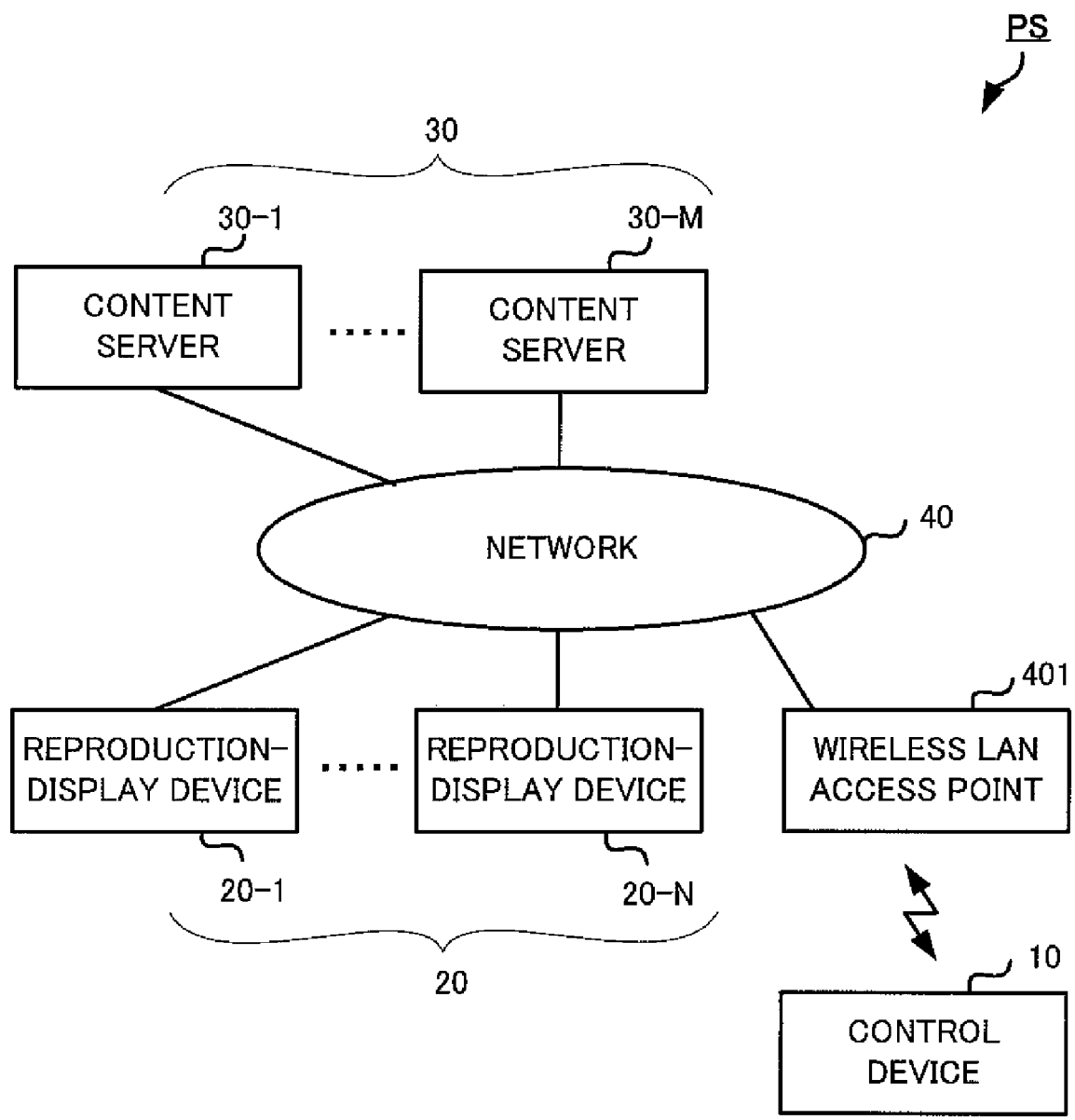
FIG. 1 is a diagram showing an entire configuration of a content reproducing system according to an embodiment of the present invention.

A content reproduction system PS according to First embodiment of the present invention will be described hereinafter. As shown in FIG. 1, the content reproduction system PS includes a control device 10, a plurality of reproduction-display devices 20 (reproduction-display devices 20-1 to 20-N), and a plurality of content servers 30 (content servers 30-1 to 30-M). The reproduction-display device 20 and the content server 30 are connected with each other via a network. The number N for the reproduction-display devices 20 and the number M for the content server 30 may be arbitrary.

The network 40 can be any network capable of sending and receiving data, such as the Internet, a public line, and a home network. Further, while each of the devices 10 and 20 and the content server 30 may be connected to the network 40 either by a wireless connection or a wired connection, the control device 10 is connected to the network 40 via a wireless LAN (Local Area Network) access point 401 in this embodiment.

Each of the content servers 30-$m$ (m: 1 to M) is an HDD recorder, a music server, or the like, and retains content data such as video, a still image, and music. The content server 30 is a DMS (Digital Media Server) in above-described 3Box, for example.

Each of the reproduction-display devices 20-$n$ (n: 1 to N) is constructed by a TV set, a monitor, or the like, and obtains content data retained by the content server 30 and reproduces and displays the obtained content data. The reproduction-display device 20 is a DMR (Digital Media Renderer) in 3Box, for example.

The control device 10, according to users operation, selects content data which the user requests, from among a plurality of sets of content data retained by the content server 30, and reproduces and displays the content data on a reproduction-display device 20 which the user requests. The control device 10 is a DMC (Digital Media Controller) in 3Box, for example. Further, the control device 10 performs a search for the reproduction-display device 20 by a short range wireless communication, searches for the reproduction-display device 20 and the content server 30 via the network 40, a search for content data retained by the content server 30, etc.

Figure 2:
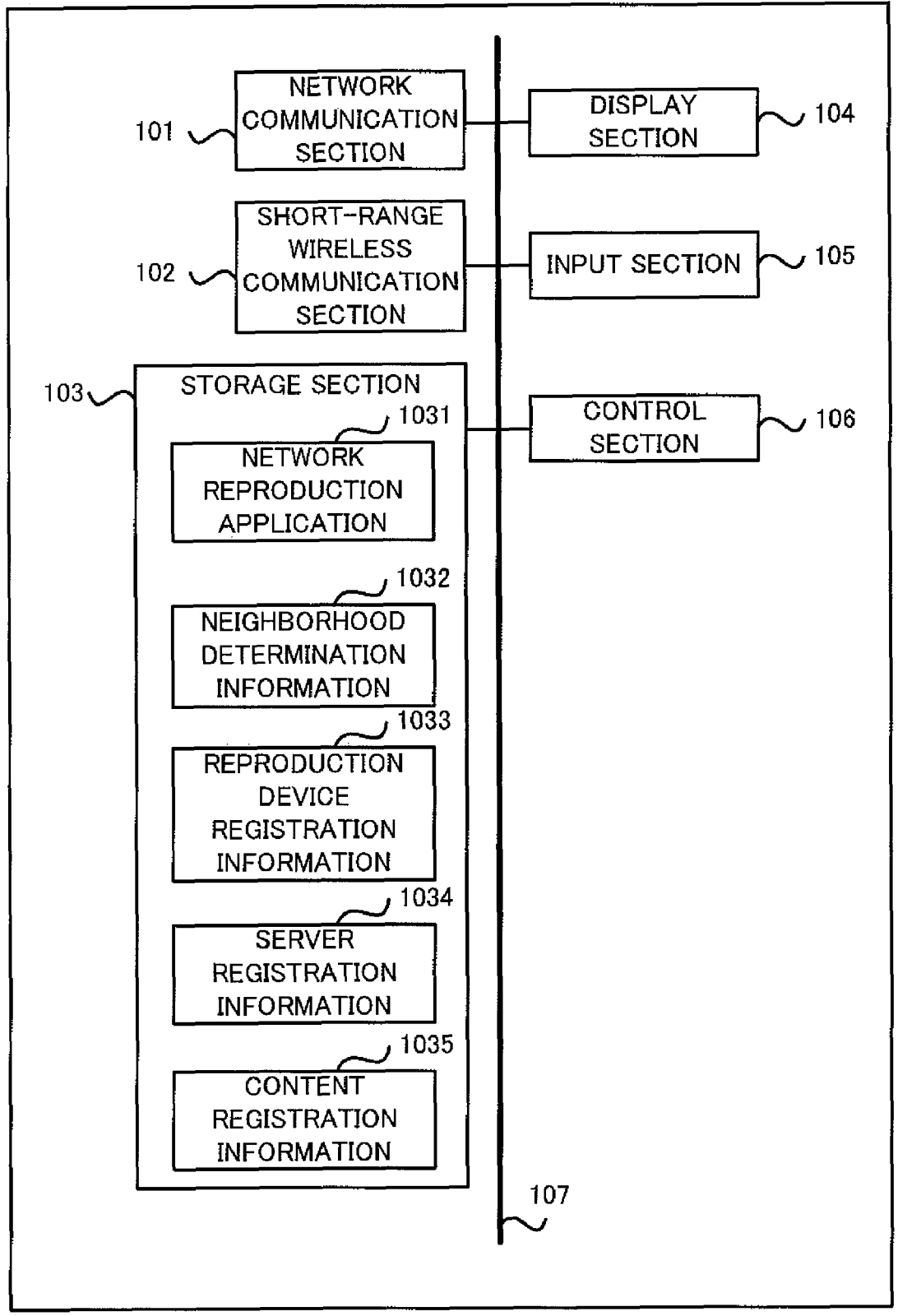
FIG. 2 is a block diagram showing a configuration of a control device of First embodiment.

Hereinafter, each of the constituents configuring such a content reproduction system PS will be described in detail. First, a circuit configuration of the control device 10 will be described. The control device 10 includes, as shown in FIG. 2, a network communication section 101, a short-range wireless communication section 102, a storage section 103, a display section 104, an input section 105, a control section 106 and a bus 107.

The network communication section 101 performs communication with the reproduction-display device 20 or the content server 30 via the network 40. For example, the network communication section 101 transmits a transmission request signal requesting the reproduction-display device 20 or the content server 30 to transmit predetermined information and transmits various instruction signals (command information) for instructing the reproduction-display device 20 or the content server 30 how to operate. Note that a communication method here is a wired LAN or a wireless LAN, for example.

The short-range wireless communication section 102 performs a short range wireless communication with the reproduction-display device 20 in a communicable range which is narrower than that for the communication by the network communication section 101. The short-range wireless communication methods include an infrared communication, RFID (Radio Frequency Identification), Bluetooth (registered trademark), and UWB (Ultra Wide Band), for example.

The short-range wireless communication section 102 is used for a purpose specific to the present invention, that is, for determining the reproduction-display device 20 located in the neighborhood based on the control device 10. For example, the short-range wireless communication section 102 receives the predetermined information for determining the reproduction-display device 20 located in the neighborhood thereof, from each of the reproduction-display devices 20-$n$ which are capable of performing the short-range wireless communication therewith.

The storage section 103 stores various kinds of data. For example, the storage section 103 stores a control program for the control section 106. The storage section 103 may be either a memory contained in the control device 10 or a removable external memory.

Further, the storage section 103 stores a network reproduction application 1031, neighborhood determination information 1032, reproduction device registration information 1033, server registration information 1034, and content registration information 1035, which are necessary for a content reproduction operation specific to the present embodiment. The network reproduction application 1031 is an application program for performing a series of content reproduction processing including search processing for the reproduction-display device 20 and the content server 30.

The neighborhood determination information 1032 is information indicating the reproduction-display device 20-$n$ which is determined by the control device 10 to be located in the neighborhood of the control device 10. The neighborhood determination information 1032 can register information of a plurality of reproduction-display devices 20. In First embodiment, the neighborhood determination information 1032 registers the reproduction-display device 20, from which the predetermined information can be obtained by the short-range wireless communication performed by the short-range wireless communication section 102.

As shown in FIG. 3A, the neighborhood determination information 1032 associates a reproduction-display device name NNk (k: 1 to K, K: the number of the reproduction-display devices 20 determined to be located in the neighborhood of the control device 10) for identifying the reproduction-display device 20 which is determined to be located in the neighborhood, an address ANk provided to the reproduction-display device 20, etc. with one another. Note that the control device 10 obtains "neighborhood device information" for composing the neighborhood determination information 1032 from each of the reproduction-display devices 20 via the short-range wireless communication section 102.

The reproduction device registration information 1033 is information regarding the reproduction-display device 20 which is detected by the search of the control device 10 via the network 40 and is capable of communicating with the network communication section 101. As shown in FIG. 3B, the reproduction device registration information 1033 associates a reproduction-display device name NDn (n: 1 to N) for identifying each of the detected reproduction-display devices 20-$n$, an address ADn provided to each of the reproduction-display devices 20, etc. with one another. Note that the control device 10 obtains "reproduction device information" for composing the reproduction device registration information 1033 from each of the reproduction-display devices 20 via the network communication section 101.

The server registration information 1034 is information regarding the content server 30 which is detected by the search of the control device 10 via the network 40 and is capable of communicating with the network communication section 101. As shown in FIG. 4A, the server registration information 1034 associates a server name NSm (m: 1 to M) for identifying the detected content server 30-$m$, a server address ASm provided to each of the content servers 30-$m$, etc. with one another. Note that the control device 10 obtains "content server information" for composing the server registration information 1034 from each of the content servers 30 via the network communication section 101.

The content registration information 1035 is information regarding content data retained by each of the content servers 30. As shown in FIG. 4B, the content registration information 1035 associates a content name NCl (l: 1 to L, L: the number of the contents retained by the content server 30-$m$) of each set of the content data retained by the content server 30, the server name NSm, a retaining folder FL1, etc. with one another. Note that the control device 10 obtains "content information" for composing the content registration information 1035 from each of the content servers 30 via the network communication section 101.

The display section 104 shown in FIG. 2 includes a panel such as a liquid crystal display, a driver circuit, etc. and displays any image such as, a basic operation screen, a screen showing registered contents of each set of the above-described information 1033, 1034, and 1035, etc. The display section 104 may include a plurality of display panels.

The input section 105 includes a keyboard, a mouse, etc., and accepts user's operation and inputs an operation signal into the control section 106. For example, the input section 105 is used for selecting the content which is requested by the user for reproduction and display, and for selecting the reproduction-display device 20 which is requested by the user to reproduce the selected content.

The control section 106 includes a micro-processor unit and the like, and controls entire operation of the control device 10. Further, the control section 106 transmits various signals, instructing the reproduction-display device 20 or the content server 30 how to operate, via the network communication section 101 or the short-range wireless communication section 102. The bus 107 transmits data reciprocally between the respective sections of the control device 10.

Figure 5:
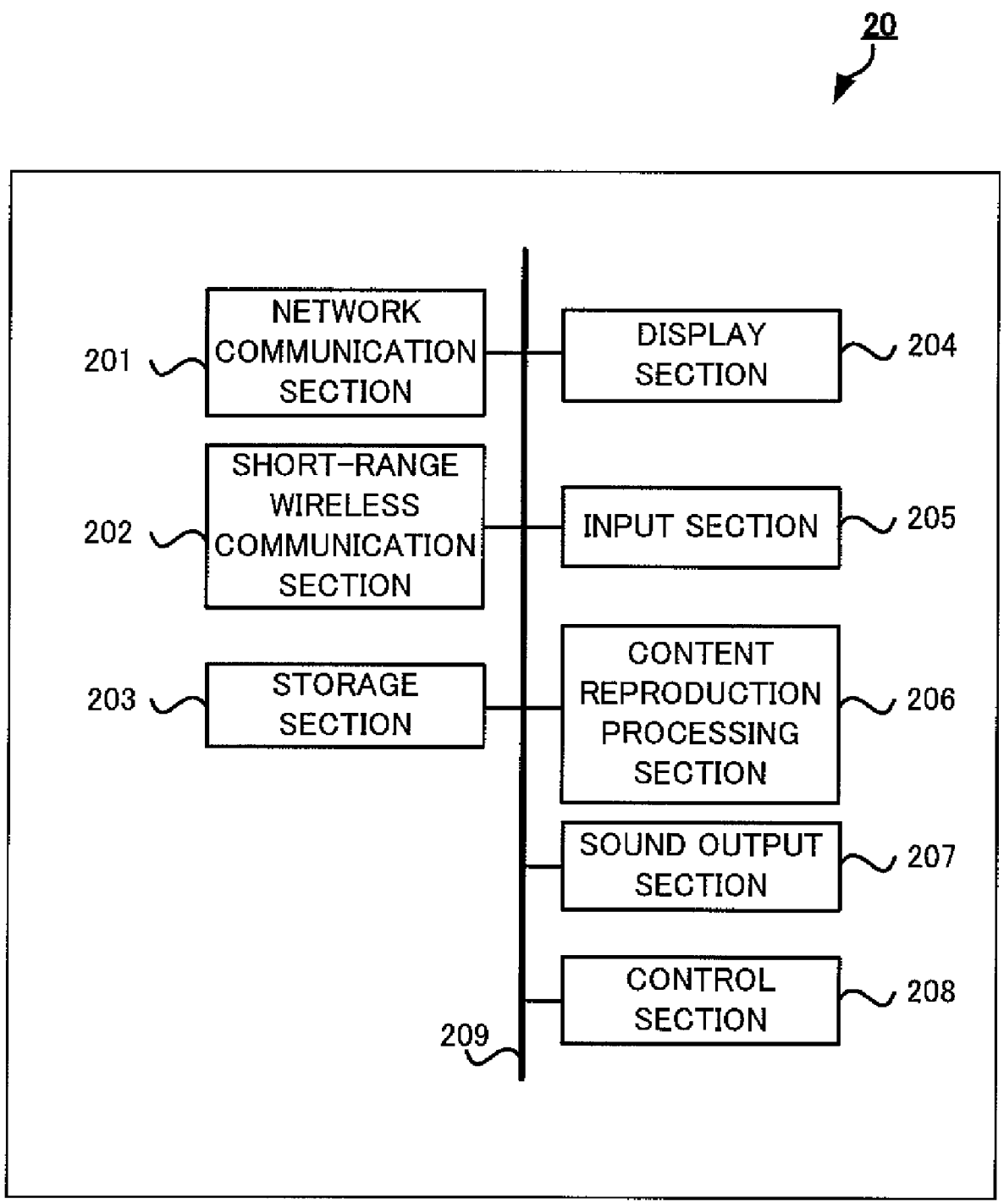
FIG. 5 is a block diagram showing a configuration of a reproduction-display device of First embodiment.

Next, the reproduction-display device 20 will be described. As shown in FIG. 5, the reproduction-display device 20 includes a network communication section 201, a short-range wireless communication section 202, a storage section 203, a display section 204, an input section 205, a content reproduction processing section 206, a sound output section 207, a control section 208, and a bus 209.

The network communication section 201 performs communication with the control device 10 or the content server 30 via the network 40. The network communication section 201 receives the transmission request signal or the reproduction instruction signal from the control device 10, transmits the reproduction device information to the control device 10, and receives the content data from the content server 30, for example. Note that the communication method here is the wired LAN or the wireless LAN, for example.

The short-range wireless communication section 202 performs the short-range wireless communication with the control device 10 in the communicable range which is narrower than that for the communication performed by the network communication section 201. For example, the short-range wireless communication section 202 receives the transmission request signal from the control device 10 and transmits the neighborhood device information for composing the neighborhood determination information 1032 of FIG. 3A. The communication method here is the infrared communication, RFID, Bluetooth (registered trademark), or WB, for example.

The storage section 203 stores various kinds of data. For example, the storage section 203 stores a control program of the control section 208 or the content data obtained from the content server 30. The storage section 203 may be either a memory contained in the reproduction-display device 20 or a detachable external memory (e.g., iVDR (Information Versatile Disk for Removable Usage).

The display section 204 is configured with a dot-matrix-type LCD (Liquid Crystal Display) panel, a driver circuit, etc., and displays any data (e.g., reproduction image of the content data) under the control of the control section 208. The display section 204 may have a plurality of display panels.

The input section 205 is configured with a keyboard, a touch-panel, a sound input device, etc., and accepts user's operation and inputs an operation signal into the control section 208. The input section 205 may be configured like a remote-commander, for example, to be separated from a chassis containing the parts of the reproduction-display device 20.

The content reproduction processing section 206 decodes the content data which is obtained from the content server 30 via the network communication section 201 and reproduces the decoded content data. The image of the reproduced content is displayed on the display section 204. The sound output section 207 includes a speaker, a DAC (Digital Analog Converter), etc., and performs DA conversion on a sound signal of the content which is reproduced by the content reproduction processing section 206 and outputs the sound from the speaker, for example.

The control section 208 is configured with a micro-processor unit and the like, and controls entire operation of the reproduction-display device 20. For, example, the control section 208, in response to the reproduction instruction signal from the control device 10, controls the network communication section 201 to obtain the content from the content server 30. The bus 209 transmits data reciprocally between the respective sections of the reproduction-display device 20.

Figure 6:
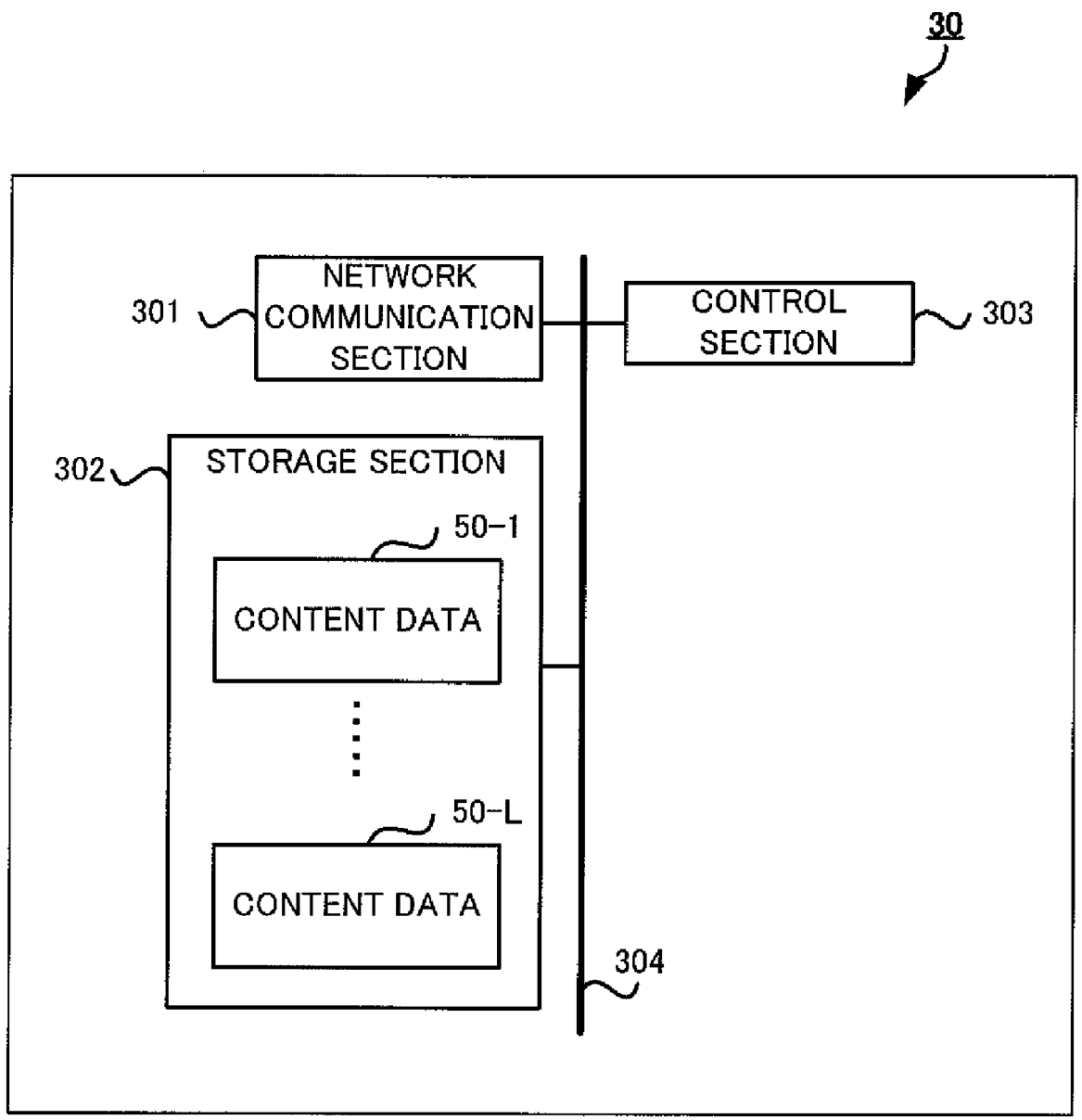
FIG. 6 is a block diagram showing a configuration of a content server of First embodiment.

Next, the content server 30 will be described. As shown in FIG. 6, the content server 30 includes a network communication section 301, a storage section 302, a control section 303, and a bus 304. The network communication section 301 performs communication with the control device 10 and the reproduction-display device 20 via the network 40. For example, the network communication section 301 receives the transmission request signal from the control device 10, transmits the predetermined information regarding the content server 30 or the content data, and transmits the content data to the reproduction-display device 20.

The storage section 302 stores various kinds of data. For example, the storage section 302 stores a control program of the control section 303 and the content data 50-1 to 50-L shown in FIG. 6. The control section 303 is configured with a microprocessor unit and the like and controls entire operation of the content server 30. The bus 304 transmits data reciprocally between the respective sections of the content server 30.

Figure 7:
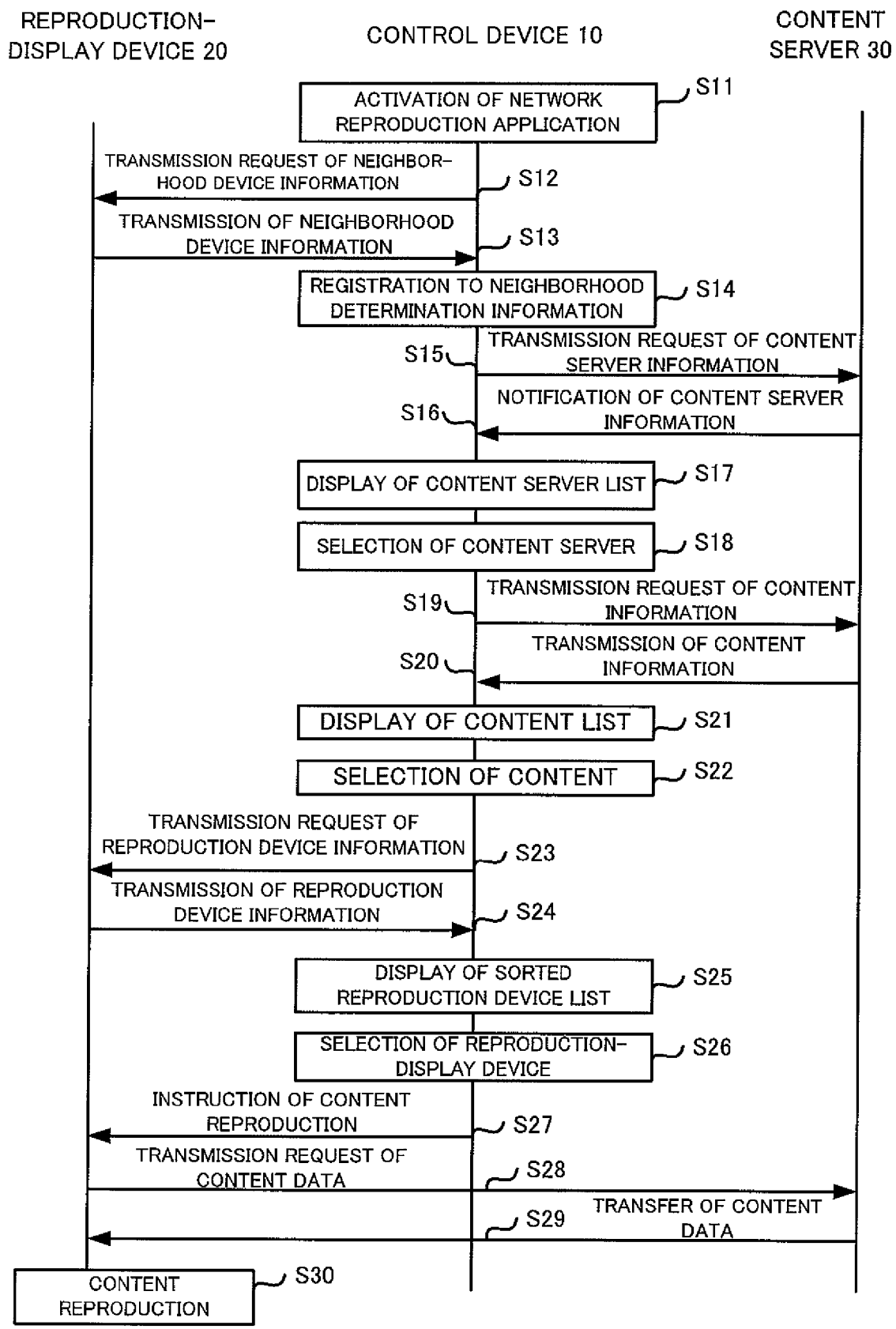
FIG. 7 is a flowchart showing a content reproduction processing in First embodiment.

Next, there will be described content reproduction and display operation in the content reproduction system PS of First embodiment having the above configuration. As shown in FIG. 7, the control section 106 of the control device 10 activates the network reproduction application 1031 according to the operation signal output from the input section 105 in response to the user's operation (Step S11).

After the activation, the control device 10 performs processing to generate the neighborhood determination information 1032 indicating the reproduction-display device 20 which is determined to be located in the neighborhood thereof. For this purpose, the control device 10 transmits the transmission request signal requesting the transmission of the neighborhood device information via the short-range wireless communication section 102 in broadcast or multicast mode (Step S12). This transmission request signal is a signal requesting the reproduction-display device 20-$n$, which has received this signal, to transmit the neighborhood device information, which is information regarding this reproduction-display device 20-$n$, to the control device 10. Note that communication is established before the transmission for connecting the control device 10 to each of the reproduction-display devices 20-$n$.

When the reproduction-display device 20 received the transmission request signal of the neighborhood device information, the reproduction-display device 20 transmits the neighborhood device information in response to the request of the sender, the control device 10 (Step S13). This neighborhood device information includes contents composing the neighborhood determination information 1032 shown in FIG. 3A (reproduction-display device name NNk, address ANk, etc.). The reproduction-display device name NNk represents any name which the user can set for the reproduction-display device 20, such as Friendly Name and SSID (Service Set Identifier), for example. The address ANk represents an address provided for identifying the reproduction-display device 20, such as an IP (Internet Protocol) address, a Bluetooth (registered trademark) address, and URI (Uniform Resource Identifier), for example. Further, the neighborhood device information may include positional information of the reproduction-display device 20, information of a distance from the control device 10, etc.

The control device 10 registers the contents of the obtained neighborhood device information to the neighborhood determination information 1032 and stores the registered contents to the storage section 103 (Step S14). In the present embodiment, when the control device 10 completes receiving the neighborhood device information from the plurality of reproduction-display devices 20, the control device 10 registers all the sets of information to the neighborhood determination information 1032.

Subsequently, the control device 10 searches for the content servers 30 on the network 40 and performs registration processing of the detected content servers 30 to the server registration information 1034. For this purpose, the control device 10 transmits the transmission request signal requesting transmission of the content server information, via the network communication section 101 in the broadcast or multicast mode (Step S15).

When the content server 30 completes receiving this transmission request signal, the content server 30 transmits the content server information in response to the request (Step S16). The content server information is information for composing the server registration information 1034 shown in FIG. 4A, including the server name NSm and the server address ASm of the content server 30, for example. The server name NSm is any name set for each of the content servers 30-$m$, and the server address ASm is an address provided to each of the content servers 30-$m$. The content server information may include a function to be supported, a version, a kind of the device, a manufacturer's name, etc.

The control device 10 registers the received contents of the content server information to the server registration information 1034 and stores the registered contents to the storage section 103. Further, the control device 10 displays a list of the content servers 30 registered in the server registration information 1034 (hereinafter, called "content server list") and an image prompting the user to select the content server 30 from the list on the display section 104 (Step S17).

The control section 106 of the control device 10 obtains data indicating the desired content server 30-$m$ which is selected by the user via the input section 105 (Step S18). The network communication section 101 transmits the transmission request signal requesting the transmission of the content information to the content server 30-$m$ indicated by the above data (Step S19).

The receiving side transmits the content information to the control device 10 in response to the request (Step S20). The content information is information regarding the content data 50-1 retained by the content server 30 and includes contents for composing the content registration information 1035 shown in FIG. 4B (content name NCl of each set of the content data 50-1, server name NSm, and retaining folder FL1). Further, the content information may include a file name, an extension, the number of contents, a kind of content, etc.

The control device 10 registers the contents of the received content information to the content registration information 1035 and stores the registered contents to the storage section 103. Further, the control device 10 displays a list of content data 50-1 registered in the content registration information 1035 (hereinafter, called "content list") and an image prompting the user to select the content data 50-1 from the content list, on the display section 104 (Step S21).

When the user selects the content which the user requests for reproduction (Step S22), the control device 10 searches the reproduction-display devices 20 and performs processing to compose the reproduction device registration information 1033. For this purpose, the network communication section 101 of the control device 10 transmits the transmission request signal requesting the transmission of the reproduction device information to the reproduction-display devices 20 in the broadcast or multicast mode (Step S23).

Each of the receiving sides of this transmission request signal transmits the reproduction device information to the sender, the control device 10 (Step S24). This reproduction device information includes contents for composing the reproduction device registration information 1033 shown in FIG. 3B (reproduction-display device name NDn and address ADn of the reproduction-display device 20). Further, the reproduction device information may include a function to be supported, a version, a kind of the device, a manufacturer's name, etc.

The control device 10 receives the reproduction device information and temporarily registers contents indicated by this information to the reproduction device registration information 1033. Then, if the reproduction-display device 20 registered in the neighborhood determination information 1032 in Step S14 exists among the reproduction-display devices 20 registered in the reproduction device registration information 1033, the control device 10 sorts this reproduction-display device 20 to be placed at the top of the reproduction device registration information 1033. Thereby, the control device 10 generates the reproduction device registration information 1033 shown in FIG. 3B and retains this information.

Further, the control device 10 displays a list of the reproduction-display devices 20 registered in the reproduction device registration information 1033 (hereinafter, called "reproduction device list") and an image prompting the user to select the reproduction-display device 20-*n* from the reproduction device list, on the display section 104 (Step S25). Note that the reproduction device list displays the reproduction-display devices 20 sequentially from one placed at the top by the above-described sorting. Then, the control device 10 obtains data indicating the reproduction-display device 20, which the user requests, via the input section 105, and selects the reproduction-display device 20 (Step S26).

Instead of the processing in Steps S25 and S26 (display of the reproduction device list and user's selection operation of the reproduction-display device 20), the control device 10 may automatically select the reproduction-display device 20 which is determined to be located in the neighborhood thereof.

The control device 10 transmits the reproduction instruction signal instructing to reproduce and display the content to the selected reproduction-display device 20 (Step S27). This reproduction instruction signal includes information indicating the content name NCl of the content data 50-1 to be reproduced, the server name NSm of the content server 30-*m* retaining this content, the retaining folder FL1, a reproduction start position, a reproduction speed, etc, for example.

The reproduction-display device 20 on the receiver side transmits a data request signal for requesting the transmission of the content data designated by the reproduction instruction signal to the content server 30 (Step S28). The receiver side of the data request signal transfers the requested content data (Step S29). The reproduction-display device 20 obtains this content data, and reproduces and displays the content data (Step S30).

As described hereinabove, the control device 10 of First embodiment initially determines that the reproduction-display device 20, from which the control device 10 has been able to obtain the neighborhood device information by the short-range wireless communication, is located in the neighborhood of the control device 10, and registers this reproduction-display device 20 to the neighborhood determination information 1032. Then, the control device 10 detects the reproduction-display devices 20 connected to the network 40, to which the content server 30 is also connected, using the network communication section 101, and registers these reproduction-display devices 20 to the reproduction device registration information 1033. If the reproduction-display device 20 registered in the neighborhood determination information 1032 exists in the reproduction device registration information 1033, this reproduction-display device 20 is designated by priority, and reproduces and displays the content. Note that the user can arbitrarily select the content server 30 for supplying the content to the reproduction-display device 20 and the content data to be reproduced and displayed in the reproduction-display device 20.

Thereby, when the content is reproduced and displayed, it is possible to select the reproduction-display device 20 located in the neighborhood of the control device 10 and to improve the user's convenience. Further the user can reproduce and display a desired content or a desired content server on the reproduction-display device 20 located in the neighborhood of the control device 10 which the user is using.

According to First embodiment, when the user selects the reproduction-display device 20 from the reproduction device list, the control device 10 sorts the reproduction-display device 20, which is determined to be located in the neighborhood thereof, to be displayed at the top of the reproduction device list. Thereby, selecting the reproduction-display device 20, it is easy for the user to find the reproduction-display device 20 located in the neighborhood of the control device 10.

(Variation)

The present invention is not limited to the above-described embodiment and various modifications and applications are possible. Further, it is possible to combine the above-described embodiment and a variation arbitrarily.

A criterion for determining the reproduction-display device 20 located in the neighborhood of the control device 10 is not limited whether the short-range wireless communication section 102 can obtain the neighborhood device information or not. For example, the criterion for the determination may be a receiving level when the short-range wireless communication is mutually performed between the control device 10 and the reproduction-display device 20 (e.g., received electric wave strength).

In this case, the control device 10 measures the received electric wave strength when the control device 10 receives the neighborhood device information from the reproduction-display device 20. Then, when the strength is determined to be greater than a predetermined value, the control device 10 determines the sender is located in the neighborhood. Further, the received electric wave strength for the criterion of the determination may be a value measured by the reproduction-display device 20 when the reproduction-display device 20 completes receiving the transmission request signal from the control device 10. In this case, the reproduction-display device 20 transmits information indicating the measured value to the control device 10. This information may be included in the neighborhood device information to be transmitted.

Note that, when the communication method in the network communication section 101 is the same as the short-range wireless communication method in the short-range wireless communication section 102 (e.g., wireless LAN), one communication section may be configured to combine the both sections.

Timing of requesting the transmission of the neighborhood device information is not limited to the timing immediately after the activation of the network reproduction application 1031. For example, the timing may be timing after the selection of the content server or the content, or timing after the display of the content server list or the content list. Further, the transmission of the neighborhood device information may be requested periodically during the execution of the network reproduction application 1031.

When the control device 10 completes receiving the neighborhood device information from each of the plurality of reproduction-display devices 20, the control device 10 may register a part of the information to the neighborhood determination information 1032. Further, the registered contents of the neighborhood determination information 1032 may be updated by periodic transmission of the transmission request signal requesting the neighborhood device information.

The method of the control device 10 to obtain the neighborhood device information or the reproduction device information from the reproduction-display device 20 is not limited to the method of the control device 10 to obtain each set of the information by requesting the transmission thereof. For example, the reproduction-display device 20 may transmit the neighborhood device information or the reproduction device information at a predetermined interval to the control device 10. This method can be also applied to the case in which the control device 10 obtains the content server information or the content information from the content server 30.

When the control device 10 transmits the transmission request signal for the predetermined information to the reproduction-display devices 20, the control device 10 may repeat unicast communication with each of the reproduction-display devices 20-n. Also in this case, communication is established before the transmission for connecting the control device 10 to each of the reproduction-display devices 20-n as in the above-described broadcast or multicast mode. This method can be applied to the case in which the control device 10 requests the content server 30 to transmit the predetermined information.

When the user selects the desired reproduction-display device 20 from the reproduction device list, the control device 10 may display only the reproduction-display devices 20 located in the neighborhood of the control device 10. For example, the control device 10 may display a list of the reproduction-display devices 20 registered in the neighborhood determination information 1032.

The method of the control device 10 to automatically select the reproduction-display device 20, which is determined to be located in the neighborhood thereof, is arbitrary and the reproduction-display device 20 may be selected at random from the neighborhood determination information 1032, for example. Further, the control device 10 may provide priorities to the reproduction-display devices 20 in the neighborhood determination information 1032 according to the received electric wave levels of the short-range wireless communication, and may automatically select the reproduction-display device 20 having the highest priority thereof.

When many content servers 30 are registered in the server registration information 1034, there might be a problem that visibility or operability of the screen is deteriorated when the user selects the content server 30 from the content server list. Therefore, the control device 10 is preferably provided with a function to display the content server list divided into a plurality of pages according to an information amount of the server registration information 1034 and a function to search for the desired content server 30-m from the content server list. This method can be applied also to the case of displaying the content list or the reproduction device list.

The method of the reproduction-display device 20 to obtain the content data from the content server 30 is arbitrary. For example, the control device 10 transmits the reproduction instruction signal to the content server 30 instead of the reproduction-display device 20 and makes the signal to include information for identifying the reproduction-display device 20 (e.g., reproduction-display device name NDn or address ADn). Then, the content server 30, without receiving the data request signal from the reproduction-display device 20, may transfer the content data 50-1 to the reproduction-display device 20.

Further, the method to select the content is not limited to the method in the above-described embodiment. For example, in the above-described embodiment, when the content server information is received from the plurality of content servers 30, the content is selected by the following steps: the user selects one of the servers (Steps S17 and S18), only the selected server is requested to transmit the content information (Step S19), the content list transmitted from the requested server is displayed (Step S21), and the user selects the content (Step S22). Note that this invention is not limited to this method. For example, server selection step of Steps S17 and S18 may be omitted from the series of steps shown in FIG. 7, and, when the content server information is received from the plurality of content servers 30, the control device 10 may be configured to request all the servers identified in the received content server information to transmit the content information (Step S19) and display the content lists transmitted from all the servers (Step S21), and then to allow the user to select one content from the content lists (Step S22).

The above-described flow may be replaced by a flow in which the series of the content selection operation, Steps S15 to S22, and the series of the reproduction-display device selection operation, Steps S23 to S26, are exchanged with each other.

Second Embodiment

In the above-described First embodiment, the user selects the desired reproduction-display device 20 according to the reproduction-display device name indicated in the reproduction device list. In this method, however, it might be difficult for the user to understand whether the desired reproduction-display device 20 which is confirmed by the user's own eye is the same as the reproduction-display device 20 to be selected from the reproduction device list. Therefore, there might be a problem for the user to wrongly select the reproduction-display device 20 different from the desired reproduction-display device 20.

For avoiding this problem, when the user selects the desired reproduction-display device 20, the user may select the reproduction-display device 20 by indicating the direction where the reproduction-display device 20 is located, as in the operation of a conventional infrared remote commander for TV. Hereinafter, there will be described a content reproduction system PS performing such an operation according to Second embodiment.

The content reproduction system PS of Second embodiment has the same system configuration as that of First embodiment shown in FIG. 1. Further, the circuit configurations of the control device 10, the reproduction-display device 20 and the content server 30 are also the same as those of the examples shown in FIGS. 2, 5, and 6.

Figure 8:
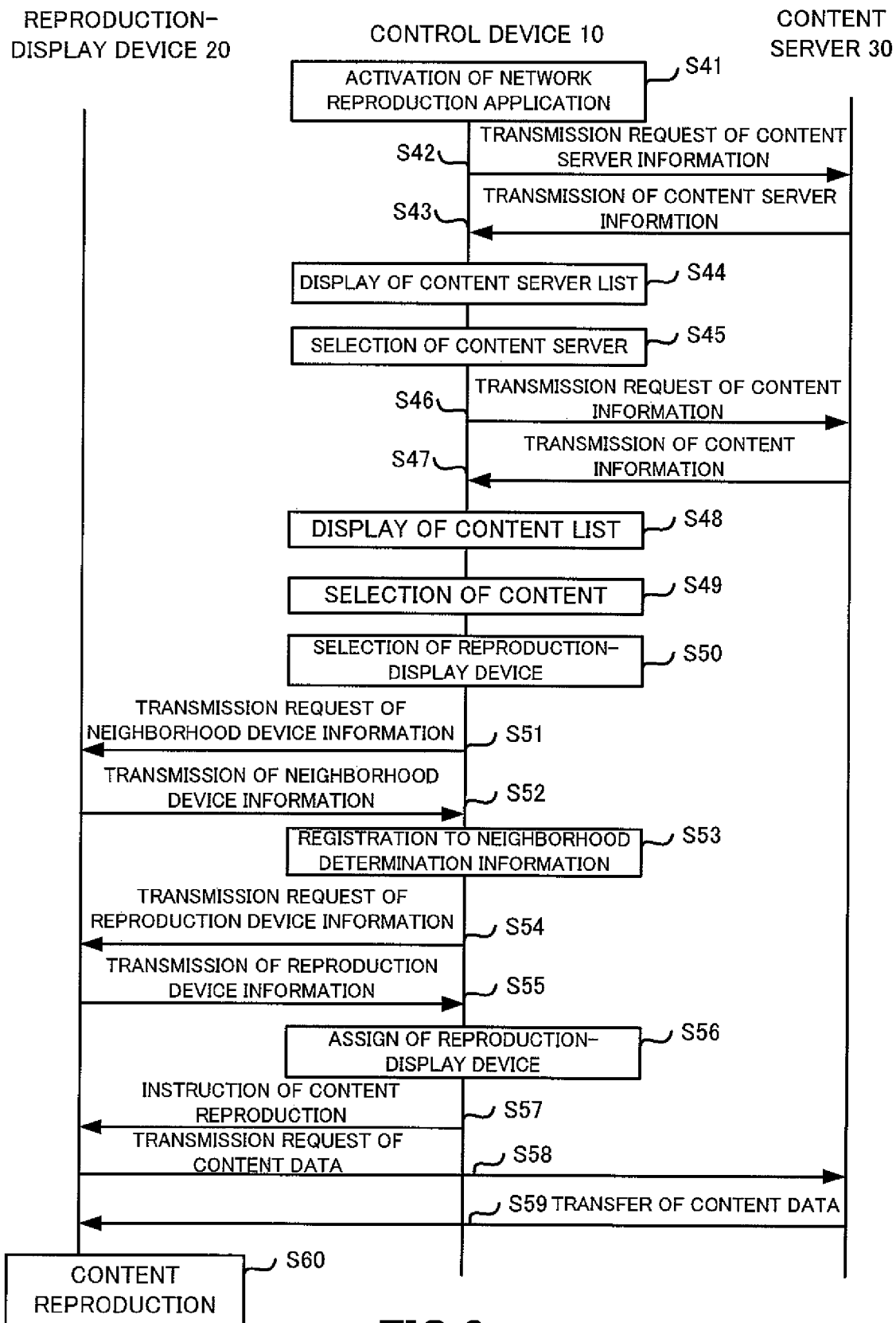
FIG. 8 is a flowchart showing a content reproduction processing in Second embodiment.

Hereinafter, the operation of the content reproduction in the content reproduction system PS of Second embodiment will be described. As shown in FIG. 8, the control device 10 performs processing in Steps S42 to S49 for processing a series of content selection operation after the activation of the network reproduction application 1031 (Step S41). The processing in Steps S42 to S49 is substantially the same as that in Steps S15 to S22 shown in FIG. 7, the content server 30 requested by the user is selected from among the content servers 30 detected in the search, and further, the content, which the user desires to reproduce, is selected from among the contents detected by the search in the content server 30.

Subsequently, the user operates the input section 105 and selects the reproduction-display device 20 to reproduce the desired content (Step S50). Here, the selection operation employs a method in which the user selects the desired reproduction-display device 20 by indicating the direction where the reproduction-display device 20 is located. For this purpose, the communication method in the short-range wireless communication section 102 is preferably a short-range wireless communication using an electric wave having directivity as in the infrared communication. In such a method, the user selects the desired reproduction-display device 20 while confirming each of the reproduction-display devices 20-n visually, and thereby a possibility to wrongly select the undesired reproduction-display device 20 may be reduced compared to the method to select the reproduction-display device 20 according to the reproduction-display device name in the reproduction device list.

Further, the selection operation of Step S50 also triggers execution start of Steps S51 to S53, which are substantially the same as Steps S12 to S14 in FIG. 7, for the determination of the reproduction-display device 20 located in the neighborhood. For this purpose, together with the user's operation in Step S50, the transmission request signal for the neighborhood device information is transmitted to the reproduction-display devices 20 including the desired reproduction-display device 20 by the short-range wireless communication. Then, the reproduction-display device 20 which has transmitted the neighborhood device information is determined to be located in the neighborhood and registered to the neighborhood determination information 1032 (Step S53).

Further, after the selection of the desired reproduction-display device 20, the control device 10 performs processing of Steps S54 and S55, which are the same as Steps S23 and S24 shown in FIG. 7, for searching the reproduction-display devices 20 connected to the network 40. That is, the control device 10 requests the transmission of the reproduction device information and obtains the reproduction device information from the reproduction-display devices 20. The transmission request of the reproduction device information may be performed at the same timing as that of the transmission request of the neighborhood device information.

Subsequently, the control device 10 checks the neighborhood determination information 1032 stored in Step S53 and determines the reproduction-display device 20 to be used from among the reproduction device information (Step S56). Then, the control device 10 instructs the determined reproduction-display device 20 to reproduce the content. The reproduction-display device 20 reproduces the content obtained from the content server 30 in a series of Steps S57 to S60 which are substantially the same as Steps S27 to S30 in FIG. 7.

As described hereinabove, in Second embodiment, the reproduction-display device 20 which the user requests is selected according to the short-range wireless communication using the electric wave having directivity.

Thereby, the user can select the desired reproduction-display device 20 while confirming the one visually, and it is possible to avoid the wrong selection of the reproduction-display device 20 different from the desired one.

Third Embodiment

In the above-described First and Second embodiments, the reproduction-display device 20 located in the neighborhood of the control device 10 is determined according to the neighborhood device information obtained by the short-range wireless communication and registered to the neighborhood determination information 1032 which indicates this reproduction-display device 20. Third embodiment is an example in which the current location of the control device 10 is identified, the reproduction-display device 20 located in the neighborhood thereof is determined according to the current location of the control device 10, and the reproduction-display device 20 is registered to the neighborhood determination information 1032.

Hereinafter, there will be described a content reproduction system PS performing such operation according to Third embodiment of the present invention. First, a configuration of the content reproduction system PS of Third embodiment will be described. The entire configuration of the content reproduction system PS of Third embodiment is the same as that of the example shown in FIG. 1. Further, a configuration of the content server 30 of Third embodiment is the same as that of the example shown in FIG. 6.

Figure 9:
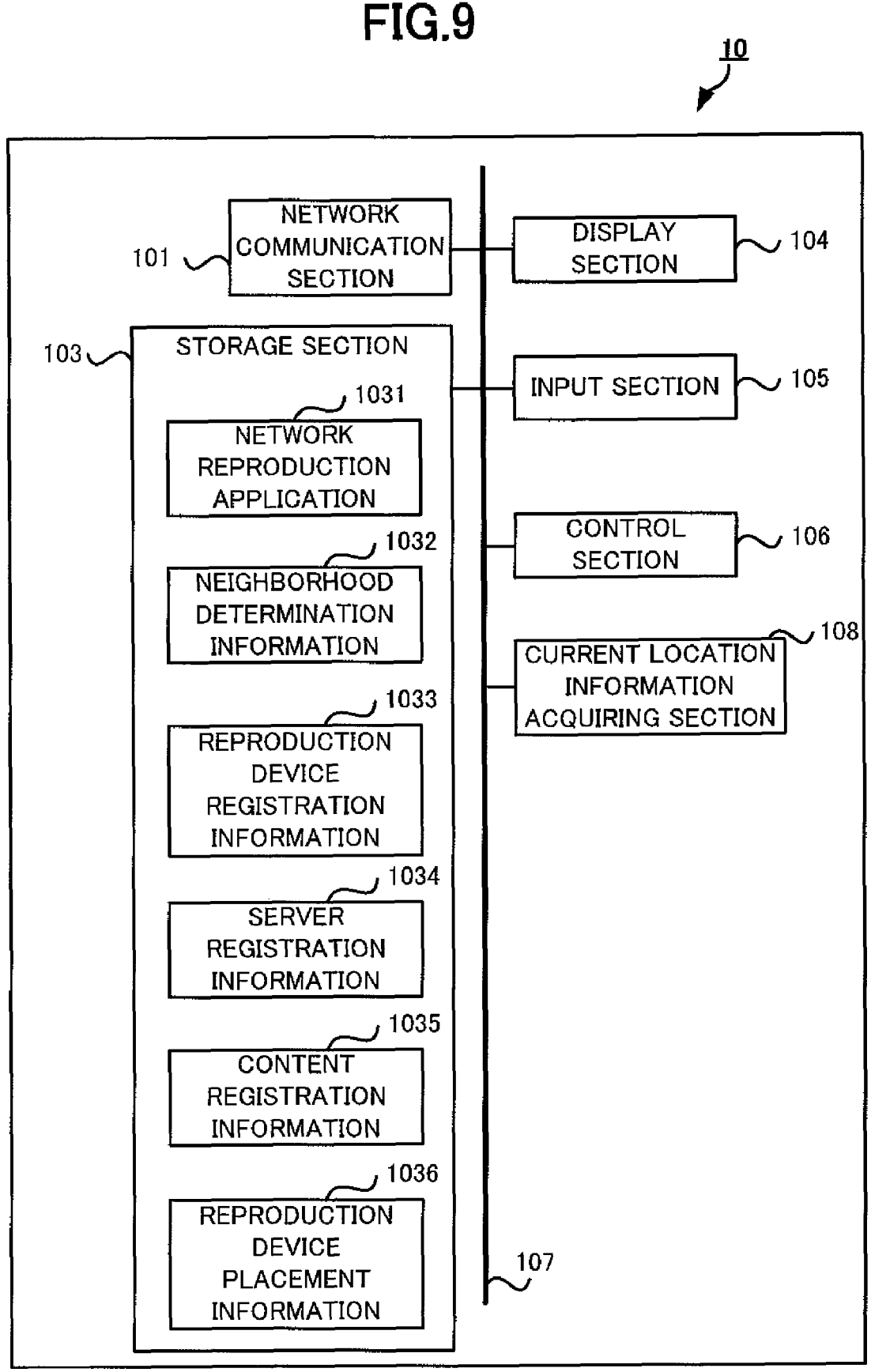
FIG. 9 is a block diagram showing a configuration of a control device of Third embodiment.
Figure 11:
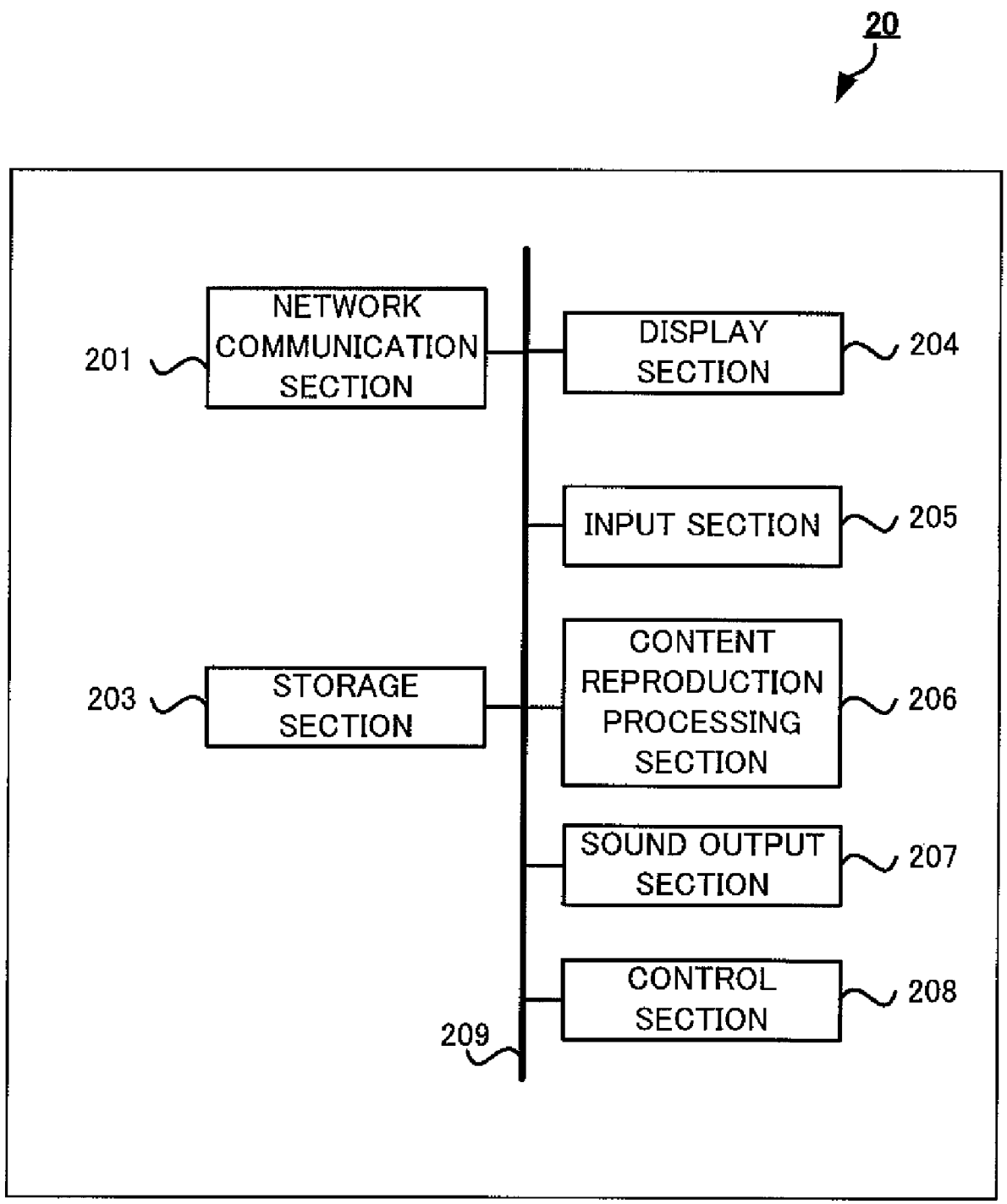
FIG. 11 is a block diagram showing a configuration of a reproduction-display device of Third embodiment.

In Third embodiment, the control device 10 does not perform the short-range wireless communication when the control device 10 determines the reproduction-display device 20 located in the neighborhood. Accordingly, as shown in FIG. 9 and FIG. 11, respectively, both of the control device 10 and the reproduction-display device 20 of Third embodiment do not include the short-range wireless communication section 102 shown in FIG. 2 or the short-range wireless communication section 202 shown in FIG. 5. Note that the reproduction-display device 20 of Third embodiment has the same configuration as that shown in FIG. 5, except for the point that the reproduction-display device 20 of Third embodiment does not have the short-range wireless communication section 202.

Further, as shown in the circuit configuration of FIG. 9, the control device 10 of Third embodiment includes a current location information acquiring section 108. In addition, the storage section 103 stores reproduction device placement information 1036.

The current location information acquiring section 108 acquires current location information indicating the current location of the control device 10. The method itself to acquire the current location information is arbitrary and it is possible to utilize any known method.

If the communication method of the network communication section 101 is the wireless LAN communication, the current location information may be information indicating a wireless LAN base station (AP: Access Point) to which the control device 10 belongs currently. This is the same for wireless communication other than the wireless LAN.

Further, the current location information acquiring section 108 may receive a positioning signals transmitted from the GPS (Global Positioning System) satellites and obtain the current location information (longitude, latitude information and altitude) from a phase difference of the positioning signals or the like.

Moreover, map information (not shown in the drawings) may be preliminarily stored in the storage section 103, and the information of latitude, longitude, and altitude obtained from GPS and the map information (not shown in the drawings) are converted to information indicating an area, which is a predetermined section such as a "living room", "bedroom", or "bathroom", and then this area information may be used for the current location information.

The reproduction device placement information 1036 is information regarding the reproduction-display device 20 connected to the network 40 and a predetermined region where the reproduction-display device 20 is placed. The example of the reproduction device placement information 1036A shown in FIG. 10A associates a reproduction-display device name NDn, an address ADn and a neighborhood base station Bn with one another. The example of the reproduction device placement information 1036B shown in FIG. 10B associates the reproduction-display device name NDn, the address ADn, and an in-house position Pn with one another.

The reproduction-display device name NDn and the address ADn in FIG. 10A and FIG. 10B are substantially the same as those illustrated in the reproduction device registration information 1033 of FIG. 3B. The neighborhood base station Bn in FIG. 10A is information indicating the wireless communication base station to which the reproduction-display device 20 belongs for the wireless communication, and is a wireless base station name set by SSID or the user, for example. The in-house position Pn in FIG. 10B indicates the predetermined region or a predetermined position where the reproduction-display device 20 is placed and is an area such as a living room or a bedroom, longitude, latitude and altitude, or the like, for example.

Next, there will be described operation of the control device 10 to register the reproduction device placement information 1036A shown in FIG. 10A for performing the operation specific to Third embodiment. Here, an example will be described for a case in which the registration operation is performed in a living room of a house H shown in FIG. 12. In this house H, there are placed three reproduction-display devices 20-1 to 20-3, and three wireless LAN access points 401-1, 401-2, and 401-3. Note that, by user's setting, the reproduction-display devices 20-1, 20-2, and 20-3 are provided with reproduction-display device names TV 1, TV 2, and monitor 1, respectively, and the wireless LAN access points 401-1 to 401-3 are provided with wireless base station names AP1 to AP3, respectively.

When the control device 10 does not detect the wireless LAN access point to which the control device 10 can belong in the own current location, the control device 10 displays a screen DS11 which prompts the user to search the wireless LAN access points around the control device 10 as shown in FIG. 13A. The case that the control device 10 has not detected the wireless LAN access point is a case that the control device 10 is used for the first time in the living room where the wireless access point 401-1 is placed, for example.

After having obtained instruction data of searching the wireless LAN access point via the input section 105, the control device 10 performs the wireless LAN communication via the network communication section 101 and detects the wireless LAN access point 401-1. In the detection, the control device 10 obtains information such as the wireless base station name (AP1) provided to the wireless LAN access point 401-1. Then, as shown in FIG. 13B, the control device 10 displays a screen DS12 showing a list of the detected wireless base station names (AP1 in this example) and guidance prompting the user to select the wireless base station to be registered to the reproduction device placement information 1036A therefrom.

After having obtained data indicating the wireless base station selected by the user via the input section 105, the control device 10 registers the wireless base station name (AP1 in the example of FIG. 13B) to the neighborhood base station Bn in the reproduction device placement information 1036A shown in FIG. 10A. At this time, the control device 10 may perform a predetermined communication setting (e.g., setting of a cryptographic key) for enabling the wireless communication to be performed via the registered wireless base station.

The control device 10, after completing the registration of the wireless base station, displays a screen DS13 showing a message of notifying the completion of the registration and guidance prompting the user to search for the reproduction-display devices 20 as shown in FIG. 13C. This search for the reproduction-display devices 20 is performed for detecting the reproduction-display device 20 which belongs to the wireless LAN access point registered in the previous step (AP1 in this example).

After having obtained instruction data of searching for the reproduction-display devices 20 via the input section 105, the control device 10 transmits the transmission request signal for the reproduction device placement information in the broadcast or multicast mode. Then, the control device 10 obtains the reproduction device placement information (reproduction-display device name NDn, the address ADn, etc.) from each of the reproduction-display devices 20-1 to 20-3 which are connected to the network 40.

After the obtaining, the control device 10 displays a screen DS14 showing a list of the detected reproduction-display devices 20-n (TV 1, TV 2, and monitor 1 in the example of FIG. 13D) and guidance prompting the user to select the reproduction-display device 20 to be registered to the reproduction device placement information 1036A therefrom. When the control device 10 completes obtaining data indicating the selected reproduction-display device 20 from the input section 105, the control device 10 registers the reproduction-display device 20 (TV 1 in the example of FIG. 13D) to the reproduction device placement information 1036A. Then, as shown FIG. 13E, the control device 10 displays a screen DS15 indicating a message of notifying the completion of the registration.

Figure 12:
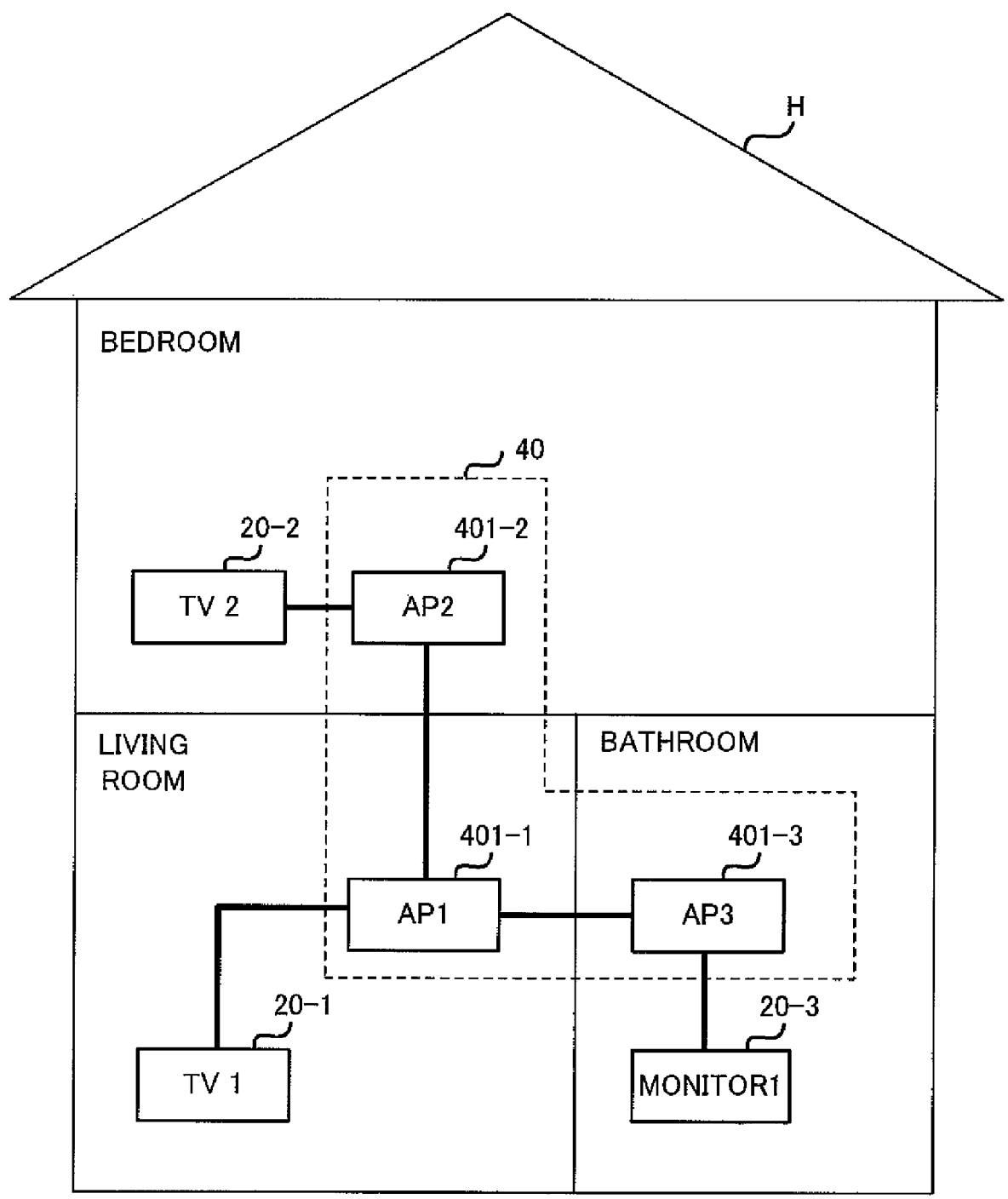
FIG. 12 is a diagram showing an example in which a plurality of reproduction-display devices and a plurality of wireless LAN access points are placed in a house.

By performing such registration operation in the bedroom or the bathroom in FIG. 12, the control device 10 associates the wireless access point AP2 placed in the bedroom and the TV 2 with each other, and the wireless access point AP3 placed in the bathroom and the monitor 1 with each other, and registers the reproduction device placement information 1036A of FIG. 10A.

Next, operation of the control device 10 to register the reproduction device placement information 1036B shown in FIG. 10B will be described using the placement of FIG. 12 as an example. The following is an example of performing the registration in the living room. Further, it is assumed that the current location information acquiring section 108 shown in FIG. 9 acquires the current location information from the GPS positioning and the control device 10 performs the registration operation according to this current location information.

Figure 14A:
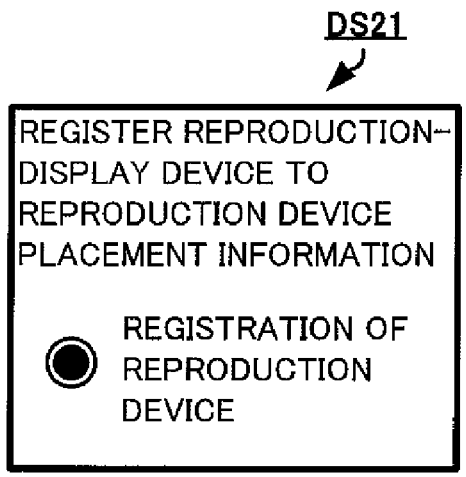
FIG. 14A is a diagram showing an example of a first screen displayed when second reproduction device placement information is registered.
Figure 14B:
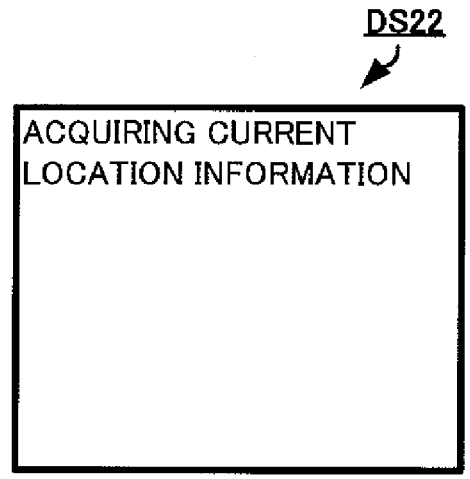
FIG. 14B is a diagram showing an example of a second screen displayed when the second reproduction device placement information is registered.

As shown in FIG. 14A, the control device 10 displays a screen DS21 showing a message prompting the user to register the reproduction-display device 20 around the control device 10 to the reproduction device placement information 1036B. When the control device 10 completes obtaining instruction data of the registration from the input section 105, the control device 10 starts obtaining the current location information from the current location information acquiring section 108. At this time, as shown in FIG. 14B, the control device 10 displays a screen DS22 showing a massage of notifying the start.

Figure 14C:
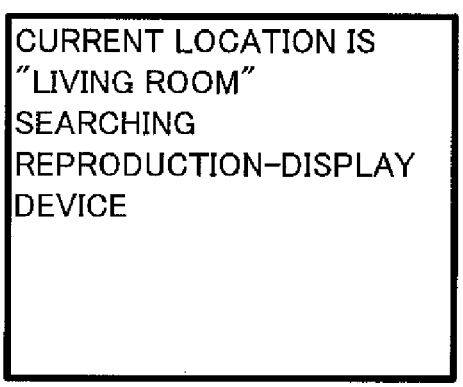
FIG. 14C is a diagram showing an example of a third screen displayed when the second reproduction device placement information is registered.

After having obtained the current location information indicating the own current location positioned by GPS (longitude, latitude and altitude), the control device 10 identifies an area including the own current location from among the areas (living room, bedroom, etc.) registered in the map information (not shown in the drawings). Then, as shown in FIG. 14C, the control device 10 displays a screen DS23 showing contents of the identified area (living room in the example of FIG. 14C) and a message notifying the start of searching for the reproduction-display devices 20.

Figure 14D:
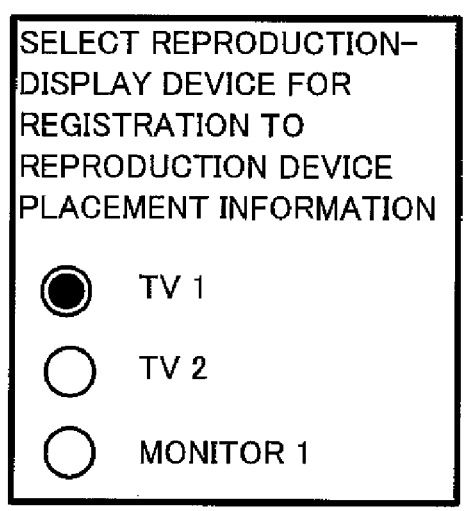
FIG. 14D is a diagram showing an example of a fourth screen displayed when the second reproduction device placement information is registered.
Figure 14E:
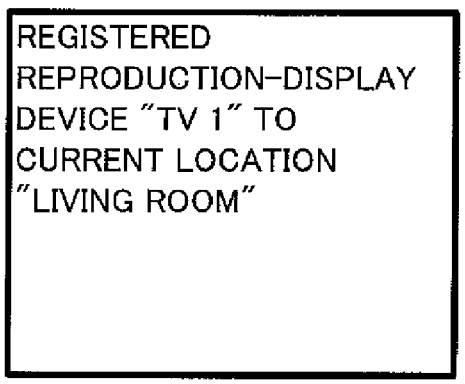
FIG. 14E is a diagram showing an example of a fifth screen displayed when the second reproduction device placement information is registered.

The control device 10 searches for the reproduction-display devices 20 connected to the network 40 by the network communication section 101. Subsequently, the control device 10 displays a screen DS24 showing a list of the detected reproduction-display devices 20-n (TV 1, TV 2, and monitor 1 in the example of FIG. 14D) and guidance to prompt the user to select the reproduction-display device 20 to be registered to the reproduction device placement information 1036B from the list. Then, the control device 10 obtains data indicating the selected reproduction-display device 20-n (TV 1 in the example of FIG. 14D) from the input section 105, and registers the selected reproduction-display device 20-n to the reproduction device placement information 1036B. Subsequently, as shown in FIG. 14E, the control device 10 displays a screen DS25 showing a message of notifying the completion of the registration. By performing such registration operation in the bedroom or bathroom of FIG. 12, the control device 10 can register the reproduction device placement information 1036B of FIG. 10B.

Next, there will be described operation of the content reproduction system PS of Third embodiment having such configuration to reproduce the content using the reproduction placement information 1036. The content reproduction operation of Third embodiment is basically the same as the processing described with reference to FIG. 7. Note that, in Third embodiment, the processing of Steps V11 and V12 shown in FIG. 15 is performed instead of the above-described processing of Steps S12 and S13 of FIG. 7.

Figure 15:
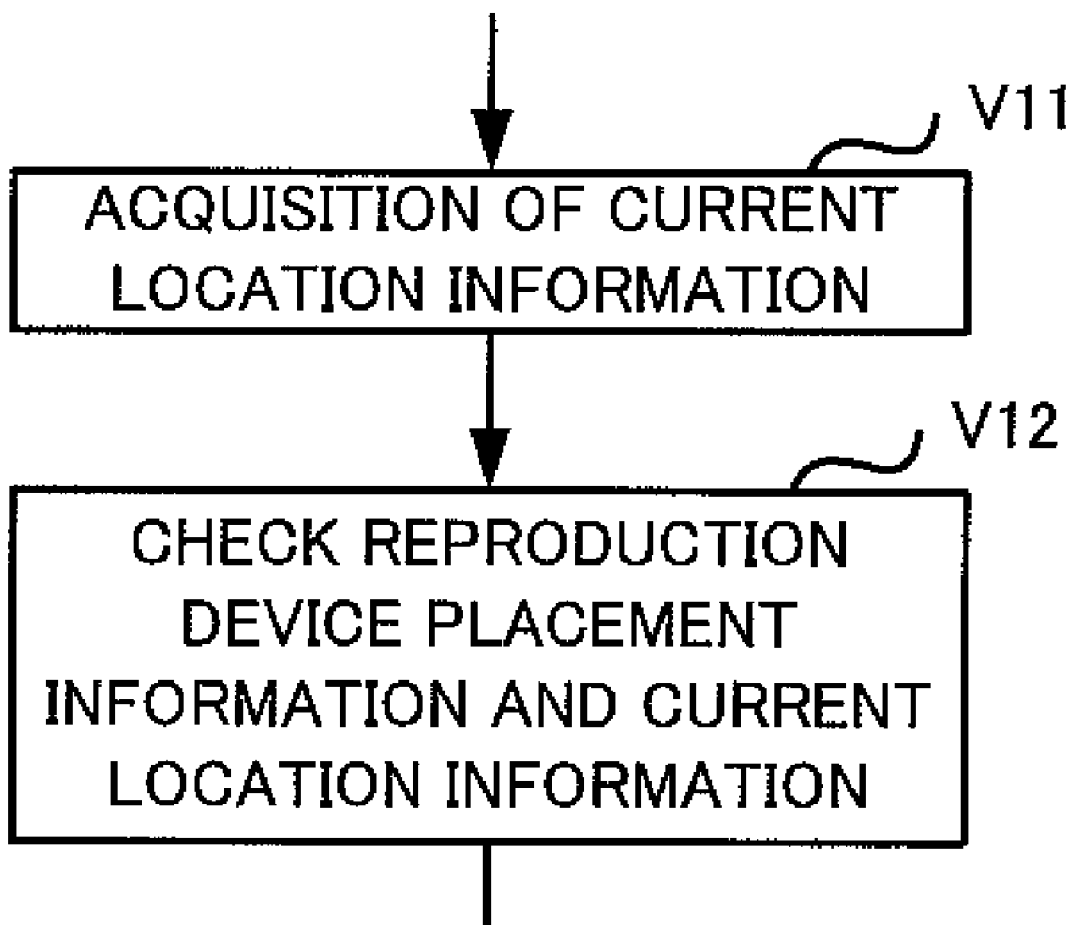
FIG. 15 is a flowchart showing content reproduction processing in Third embodiment.

After activation of the network reproduction application 1031 in Step S11 of FIG. 7, the process goes to Step V11 of FIG. 15. The control device 10 obtains the current location information via the current location information acquiring section 108 (Step V11). As described above, this current location information is the information indicating the wireless communication base station, to which the network communication section 101 belongs, the longitude, latitude and altitude obtained from GPS, and further the area (e.g., living room or bedroom) identified from the map information (not shown in the drawings) according to the longitude, latitude and altitude, or the like.

Subsequently, the control device 10 identifies the predetermined region (or predetermined position) including the current location of the control device 10 indicated by the current location information from among the predetermined regions (predetermined positions) where the reproduction-display devices 20, registered in the reproduction device placement information 1036 which is stored preliminarily in the storage section 103, are placed. This predetermined region (predetermined position) is the neighborhood base station Bn (AP1 or the like) in the example of FIG. 10A or the in-house position Pn (living room or the like) in the example of FIG. 10B.

Then, the control device 10 determines the reproduction-display device 20 associated with the identified predetermined region (or predetermined position) from among the reproduction-display devices 20 registered in this reproduction device placement information 1036, and obtains information regarding the reproduction-display device 20 (reproduction-display device name NDn and address ADn) (Step V12). In the example of FIG. 12, when the control device 10 belongs presently to the wireless access point AP1, or when the current location of the control device 10 is the "living room", the control device 10 obtains information of the reproduction-display device 20 (TV 1) associated by the reproduction device placement information 1036.

Subsequently, the process returns to FIG. 7 and the control device 10 registers the obtained information to the neighborhood determination information 1032 indicating the reproduction-display device 20 which is determined to be located in the neighborhood of the control device 10 (Step S14). Further, when the content is reproduced and displayed in the processing of Steps S15 to S30, the reproduction-display device 20 registered in the neighborhood determination information 1032 is designated by priority, and reproduces and displays the content.

As described hereinabove, Third embodiment preliminarily registers the reproduction device placement information 1036 which associates the reproduction-display device 20 and the predetermined region (or predetermined position), where the reproduction-display device 20 is placed, with each other. This predetermined region is the area such as a "living room" or "bedroom", or the wireless base station to which the reproduction-display device 20 belongs, for example. Then, the predetermined region including the current location of the control device 10, which is indicated in the current location information obtained by the current location information acquiring section 108, is identified from among the predetermined regions registered in the reproduction device placement information 1036. Further, the reproduction-display device 20 associated with the identified predetermined region is determined in the reproduction device placement information 1036 and registered to the neighborhood determination information 1032. Then, the reproduction-display device 20 registered in the neighborhood determination information 1032 is designated by priority and reproduces and displays the content.

Thereby, when the reproduction-display device 20 is selected to reproduce and display the content, it is possible to select the reproduction-display device 20 located in the neighborhood of the current location of the control device 10, and to improve the user's convenience.

The data structure of the reproduction device placement information 1036 is not limited to the examples of FIG. 10A and FIG. 10B and may be any data structure which has the same effect. For example, the reproduction device placement information 1036A of FIG. 10A and the reproduction device placement information 1036B of FIG. 10B may be combined and registered as one set of the reproduction device placement information 1036.

Fourth Embodiment

Above-described Embodiments, First to Third, improve the user's convenience by designating the reproduction-display device 20 located in the neighborhood of the control device 10. Fourth embodiment improves the user's convenience by designating the reproduction-display device 20, which reproduces and displays the content by priority, according to an attribute of the content to be reproduced and displayed. In the following, there will be described a content reproduction system PS of Fourth embodiment performing such operation.

First, a configuration of the content reproduction system PS of Fourth embodiment will be described. The system configuration of the content reproduction system PS is the same as that of the example shown in FIG. 1. Further, a configuration of the reproduction-display device 20 of Fourth embodiment is substantially the same as that of the example shown in FIG. 11.

A configuration of the content server 30 of Fourth embodiment is substantially the same as that of the example shown in FIG. 6. Note that each set of content data 50-1 retained by the content server 30 contains "content attribute information" indicating the own attribute thereof.

Figure 16:
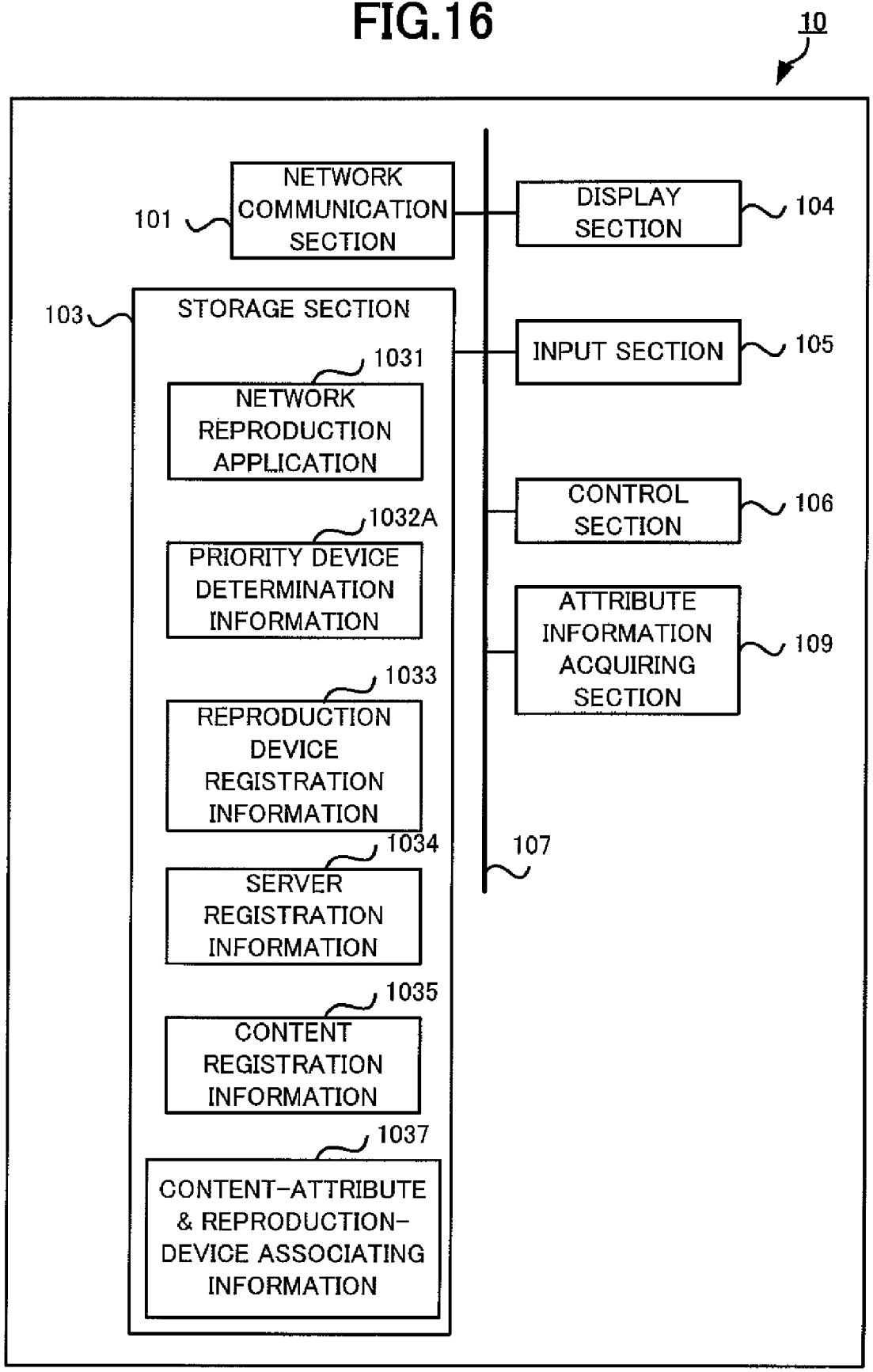
FIG. 16 is a block diagram showing a configuration of a control device of Fourth embodiment.

A basic configuration of the control device 10 of Fourth embodiment is almost the same as that of the example shown in FIG. 2. Note that, as shown in FIG. 16, the control device 10 of Fourth embodiment includes an attribute information acquiring section 109 instead of the short-range wireless communication section 102. Further, the storage section 103 shown in FIG. 16 stores priority device determination information 1032A and content-attribute & reproduction-device associating information 1037.

The attribute information acquiring section 109 acquires information indicating the attribute of the content data 50-1 retained by the content server 30 via the network 40. The attribute of the content data is a category for classifying each set of the content data 50-1, and examples thereof include a content genre such as "drama", "sport", "news", and "movie", a content creator, a content user such as a video recording operator, etc.

The data structure of the priority device determination information 1032A shown in FIG. 16 is substantially the same as that of the neighborhood determination information 1032 shown in FIG. 3A This priority device determination information 1032A is information indicating the reproduction-display device 20 to be selected by priority when the content is reproduced and displayed.

Figure 17A:
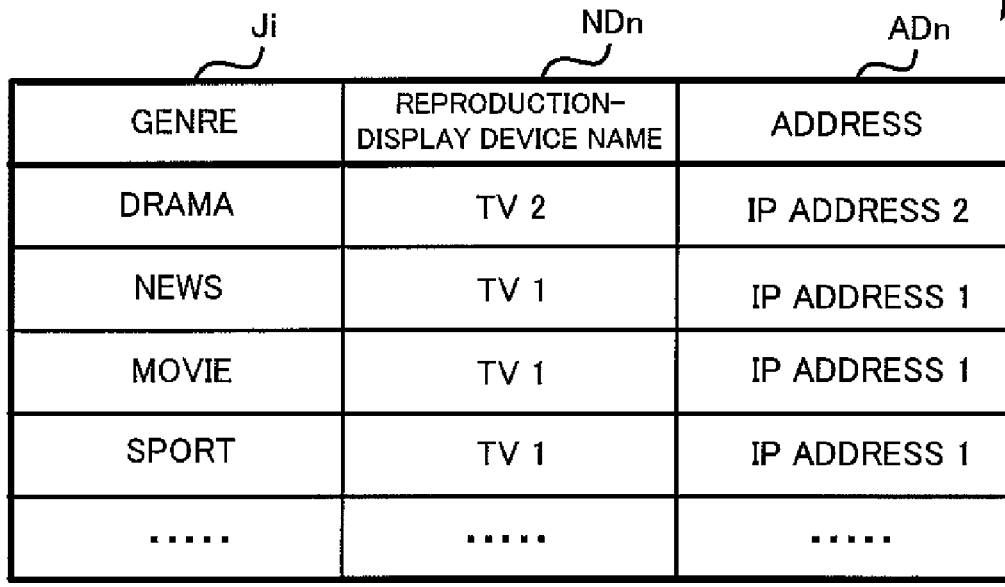
FIG. 17A is a diagram showing a first example of a data structure of content-attribute & reproduction-device associating information.
Figure 17B:
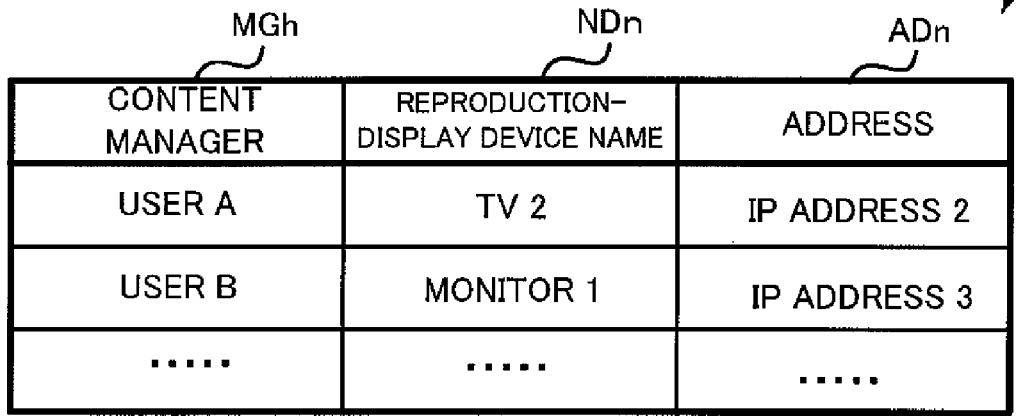
FIG. 17B is a diagram showing a second example of the data structure of the content-attribute & reproduction-device associating information.

As shown in FIG. 17A and FIG. 17B, the content-attribute & reproduction-device associating information 1037 associates the content attribute for classifying the content and the reproduction-display device 20 to be used by priority for reproducing and displaying the content having this attribute with each other. In Fourth embodiment when only the content attribute is associated with the reproduction-display device 20, the reproduction-display device 20 is placed at a position where the content data belonging to this content category is frequently reproduced.

In the example of FIG. 17A, the content-attribute & reproduction-device associating information 1037A associates a content genre Ji (i: 1 to I, I: the number of genres) and information for identifying the reproduction-display device 20 (reproduction-display device name NDn and address ADn) with each other. Examples of the genres Ji include drama, news, movie, sport, etc. The reproduction-display name NDn and the address ADn are the same as the examples shown in FIG. 3B.

In the content-attribute & reproduction-device associating information 1037A shown in FIG. 17A, the "TV 2", which is placed in the bedroom of the house H shown in FIG. 12, is assumed to be the reproduction-display device 20 for reproducing and displaying the content which belongs to the category "drama" by priority. For example, when a person utilizing the bedroom is a user α and the user α is much interested in a drama, the user's convenience can be improved. Further, contents belonging to the categories "sport", "news", and "movie" are presumed to be frequently viewed by all the family members living in the house H. In this case, the "TV 1" placed in the living room which is utilized frequently by all the family members is registered to the content-attribute & reproduction-device associating information 1037A as the reproduction-display device 20 to be used by priority.

In the example of FIG. 17B, the content-attribute & reproduction-device associating information 1037B associates a content manager MGh (h: 1 to H, H: the number of managers) who manages the content, the reproduction-display device name NDn, and the address ADn with one another. The content manager MGh is information indicating a content creator, a person who operates video recording, a main viewer of the content, or the like, for example.

In the content-attribute & reproduction-device associating information 1037B shown in FIG. 17B, the content having a user A as the manager is reproduced and displayed by priority on the "TV 2" placed in the bedroom of FIG. 12. Further, the content having a user B as the manager is reproduced and displayed by priority on the "monitor 1" placed in the bathroom.

Note that the content-attribute & reproduction-device associating information 1037 is stored preliminarily in the storage section 103 of the control device 10. Then, the registration of the content-attribute & reproduction-device associating information 1037 is set by the user's operation of the input section 105. In the example of FIG. 17A, the reproduction-display device 20 to be used by priority is registered in association with each of the genres Ji such as "drama", "news", "movie", and "sport". Further, in the example of FIG. 17B, the reproduction-display device 20 to be used by priority is registered in association with each of the content managers MGh.

Figure 18:
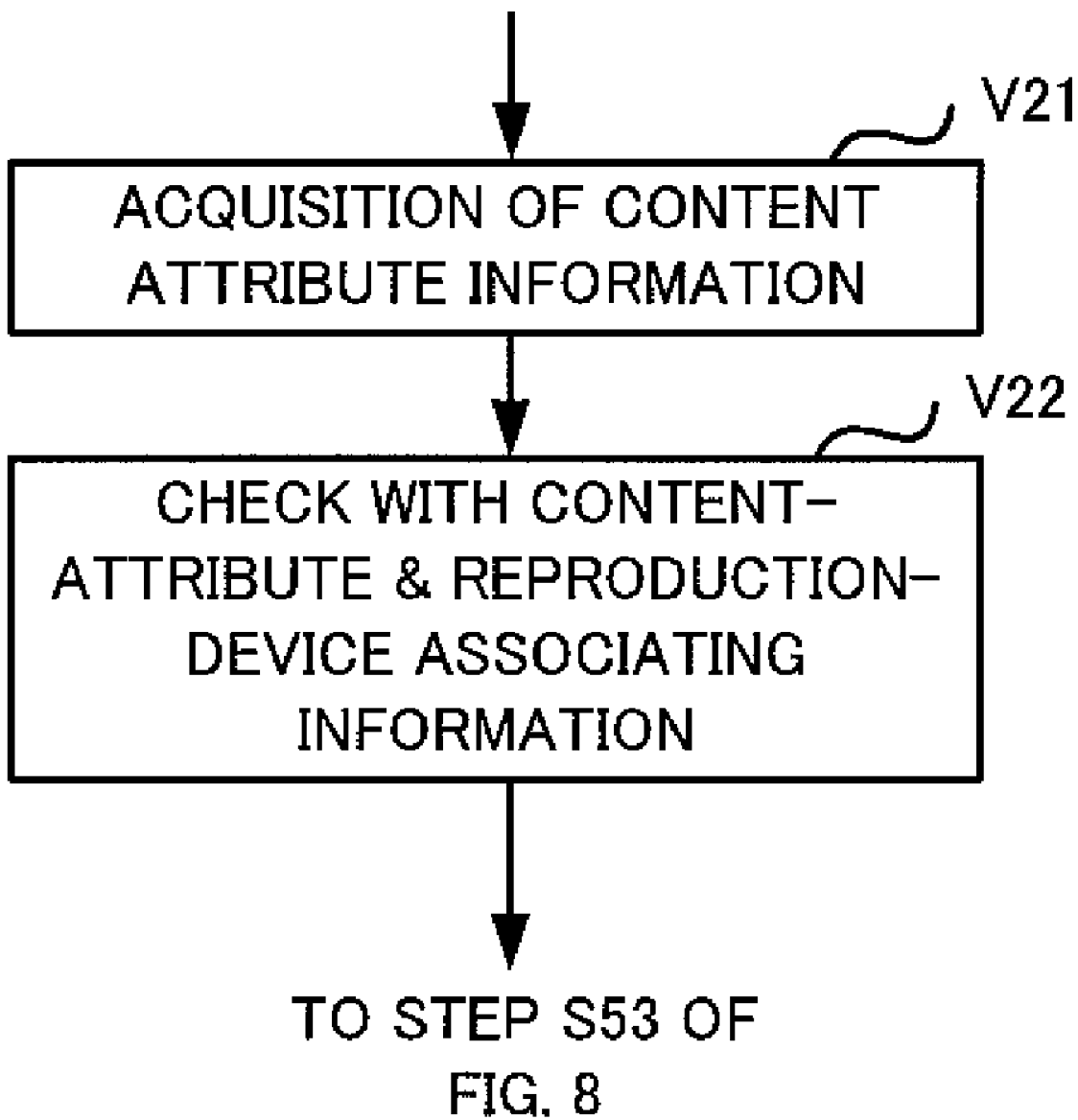
FIG. 18 is a flowchart showing content reproduction processing in Fourth embodiment.

In the following, there will be described content reproduction operation in the content reproduction system PS of Fourth embodiment having the above-described configuration. The content reproduction operation in Fourth embodiment is basically the same as the processing of Second embodiment described with reference to FIG. 8. Note that, in Fourth embodiment, the processing of Steps V21 and V22 shown in FIG. 18 is performed instead of the above-described processing of Steps S50 to S52 of FIG. 8.

That is, in Steps S41 to S49, the user selects the content data, which the user requests for reproduction, from the content data 50 retained by the desired content server 30 selected by the user. Then, the control device 10 obtains the content attribute information included in the selected content data (step V21). That is, the control device 10 transmits the transmission request signal requesting the transmission of the content attribute information to the content server 30 via the attribute information acquiring section 109. Then, the control device 10 receives the content attribute information transmitted from the content server 30 in response to the request. Further, the control device 10 reads out the content attribute information indicating the genre or the content manager of the content data 50-1.

Subsequently, the control device 10 identifies the attribute, which matches the attribute indicated by the content attribute information (genre or content manager), from among the attributes (genres Ji or content manager MGh) registered in the content-attribute & reproduction-device associating information 1037 shown in FIG. 17A or FIG. 17B. Then, the control device 10 determines the reproduction-display device 20 associated with the identified attribute among the reproduction-display devices 20 registered in the content-attribute & reproduction-device associating information 1037. Further, the control device 10 obtains the information indicating the reproduction-display device 20 (reproduction-display device name NDn and address ADn) from the content-attribute & reproduction-device associating information 1037 (Step V22).

Then, the process returns to FIG. 8 and the control device 10 registers the information obtained in the processing of Step V22 to the priority device determination information 1032A which is substantially the same as the neighborhood determination information 1032 of FIG. 3A (Step S53). Further, the control device 10 performs the processing of Steps S54 to S60 and reproduces the content.

Note that it is possible to combine the method to designate the reproduction-display device 20 according to the attribute of the content as described in Fourth embodiment and the method to designate the reproduction-display device 20 located in the neighborhood of the control device 10 as in embodiments, First to Third. In this case, the control device 10 shown in FIG. 16 is provided with the short-range wireless communication section 102 shown in FIG. 2, and the reproduction-display device 20 of FIG. 11 is provided with the short-range wireless communication section 202 shown in FIG. 5.

The control device 10 registers the reproduction-display device 20, which is determined to be located in the neighborhood of the control device 10, to the neighborhood determination information 1032 by the short-range wireless communication or obtaining the current location as shown in embodiments, First to Third.

Further, the control device 10 determines the reproduction-display device 20, which corresponds to the attribute indicated by the content attribute information, from the content-attribute & reproduction-device associating information 1037, and registers the reproduction-display device 20 to the priority device determination information 1032A shown in FIG. 16.

Then, when the control device 10 designate the reproduction-display device 20 which is used to reproduce the content of the user's request, the control device 10 determines whether or not the reproduction-display device 20, which is registered in the neighborhood determination information 1032, is also registered in the priority device determination information 1032A. If the reproduction-display device 20 is registered, the control device 10 designates this reproduction-display device 20 and instructs the reproduction-display device 20 to reproduce and display the content.

Thereby, it is possible to determine the reproduction-display devices 20 located in the neighborhood of the control device 10 and then designate the reproduction-display device 20, which is to be used for reproducing and displaying the content having a specific attribute, by priority from among the determined reproduction-display devices 20.

As described hereinabove, according to the attribute for classifying the content, Fourth embodiment registers the reproduction-display device 20, which is to be used by priority for reproducing and displaying the content having this attribute, preliminarily to the content-attribute & reproduction-device associating information 1037. The attribute for classifying the content is, for example, the content genre, the content manager, or the like. Then, Fourth embodiment identifies the attribute, which matches the attribute indicated by the content attribute information obtained by the attribute information acquiring section 109, from among the attributes registered in the content-attribute & reproduction-device associating information 1037. Further, Fourth embodiment registers the information indicating the reproduction-display device 20 corresponding to the identified attribute (reproduction-display device name NDn and address ADn) to the priority device determination information 1032A. At the time of reproducing and displaying the content, Fourth embodiment designates the reproduction-display device 20 registered in the priority device determination information 1032A and instructs the reproduction-display device 20 to reproduce and display the content.

Thereby, it is possible to designate the reproduction-display device 20 which is set to be used by priority according to the content attribute, when the content is reproduced and displayed, and therefore it is possible to improve the user's convenience.

Note that the data structure of the content-attribute & reproduction-device associating information 1037 is not limited to the examples shown in FIG. 17A and FIG. 17B, and may be any data structure which has the same effect. For example, each set of the associating information in FIG. 17A and FIG. 17B may be put together and registered as the single set of content-attribute & reproduction-device associating information 1037.

The concept of the present invention can be applied to any other device having an operation control function, for example, such as a mobile phone and a PDA, not limited to a dedicated computer. That is, a computer program causing a computer to function and operate as the control device 10 may be generated and distributed or leased, and a computer having the program installed therein may be used, transferred or leased as the control device 10.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-303591 filed on Nov. 22, 2007 and including specification, claims, drawings and summary. The disclosure of the above Japanese patent application is incorporated herein by reference in its entirety.

What is claimed is:

1. A control device configured to control a content retaining device configured to retain content and a plurality of reproduction devices configured to reproduce and display content supplied from the content retaining device via a network, the control device comprising:

a predetermined-range determination unit configured to determine a reproduction device of the plurality of reproduction devices located in a predetermined range based on the control device;

a reproduction device designating unit configured to designate at least one reproduction device from among the plurality of reproduction devices which are determined to be located in the predetermined range by the predetermined-range determination unit; and a reproduction instruction unit configured to instruct the reproduction device designated by the reproduction device designating unit to obtain the content retained by the content retaining device via the network and to reproduce and display the content;

wherein each of the content retained by the content retaining device includes content attribute information indicating an attribute owned by the content; and wherein the reproduction device designating unit includes:

an association information storing unit configured to preliminarily store association information associating a plurality of attributes for classifying the content with the plurality of reproduction devices configured to reproduce and display the content having these attributes by priority, respectively;

an attribute information acquiring unit configured to acquire the content attribute information via the network; and a reproduction device identifying unit configured to identify the reproduction device of the plurality of reproduction devices corresponding to the attribute indicated by the content attribute information acquired by the attribute information acquiring unit, in the association information, and wherein the reproduction device designating unit designates the reproduction device of the plurality of reproduction devices identified by the reproduction device identifying unit.

2. The control device according to claim 1, wherein the predetermined-range determination unit includes:

a communication unit configured to communicate with the reproduction device via the network;

a reproduction device information acquiring unit configured to acquire reproduction device information, comprising information for identifying each reproduction device of the plurality of reproduction devices, from each of the plurality of reproduction devices capable of communication by the communication unit;

a short-range wireless communication unit configured to perform short-range wireless communication, which has a communicable range narrower than that of communication performed by the communication unit, with the reproduction device of the plurality of reproduction devices; and a neighborhood device information acquiring unit configured to acquire neighborhood device information from each reproduction device of the plurality of the reproduction devices capable of the short-range wireless communication with the short-range wireless communication unit, the neighborhood device information being information for identifying each of these reproduction devices, and wherein, when registration content indicated by each set of the reproduction device information acquired by the reproduction device information acquiring unit and registration content indicated by each set of the neighborhood device information acquired by the neighborhood device information acquiring unit match each other, the predetermined-range determination unit determines the reproduction device of the plurality of reproduction units, which is a sender of the reproduction device information and the neighborhood device information, to be located in the predetermined range.

3. The control device according to claim 1, wherein the predetermined-range determination unit further includes:

a current location identifying unit configured to identify a current location of the control device;

a placement information storing unit configured to preliminarily store placement information associating the plurality of reproduction devices with respective placement regions, which are regions where the plurality of reproduction devices are placed, with each other; and a placement region identifying unit configured to identify the placement region, including the current location of the control device identified by the current location identifying unit, from among the placement regions registered in the placement information, wherein the predetermined-range determination unit determines the reproduction device of the plurality of reproduction devices corresponding to the placement region identified by the placement region identifying unit, to be located in the predetermined range, among the plurality of reproduction devices registered in the placement information.

4. The control device according to claim 2, wherein the predetermined-range determination unit further includes:

a signal level measuring unit configured to measure a wireless signal level of the short-range wireless communication which is performed with the reproduction device of the plurality of reproduction units by the short-range wireless communication unit; and a signal level determination unit configured to determine whether the wireless signal level measured by the signal level measuring unit is larger than a predetermined value, wherein, when the signal level determination unit determines the wireless signal level is larger than the predetermined value, the predetermined-range determination unit determines the reproduction device of the plurality of reproduction devices, which is in the short-range wireless communication having this wireless signal level, to be located in the predetermined range.

5. A control device configured to control a content retaining device configured to retain content and a plurality of reproduction devices configured to reproduce and display content supplied from the content retaining device via a network, the control device comprising:

a predetermined-range determination unit configured to determine a reproduction device of the plurality of reproduction devices located in a predetermined range based on the control device;

a reproduction-device designating unit configured to designate at least one reproduction device from among the plurality of reproduction devices which are determined to be located in the predetermined range by the predetermined-range determination unit; and a reproduction instruction unit configured to instruct the reproduction device designated by the reproduction-device designating unit to obtain the content retained by the content retaining device via the network and to reproduce and display the content;

wherein the predetermined-range determination unit includes:

a wireless communication unit configured to perform wireless communication with the reproduction device of the plurality of reproduction devices via a base station;

a belonging destination identifying unit configured to identify the base station to which the control device currently belongs while performing the wireless communication via the wireless communication unit;

a base station information storing unit configured to preliminarily store base station information which associates the plurality of reproduction devices with base stations to which respective reproduction devices belong during the wireless communication, respectively; and a registered base station identifying unit configured to identify the base station which matches the base station identified by the belonging destination identifying unit, from among the base stations registered in the base station information, to which the reproduction devices belong, and wherein the predetermined-range determination unit determines the reproduction device of the plurality of reproduction devices corresponding to the base station identified by the registered base station identifying unit, to be located in the predetermined range, among the reproduction devices registered in the base station information.

6. The control device according to claim 1, wherein the reproduction device designating unit includes:

a list displaying unit configured to display a reproduction device list which is a list of reproduction devices determined to be located in the predetermined range by the predetermined-range determination unit; and a manual designating unit configured to designate at least one reproduction device from the reproduction device list displayed by the list displaying unit in response to a user's operation.

7. A reproduction system comprising a content retaining device configured to retain content, a plurality of reproduction devices configured to reproduce and display content supplied from the content retaining device, and a control device configured to control the content retaining device and the plurality of reproduction devices, connected with one another via a network, wherein the control device includes:

a predetermined-range determination unit configured to determine the reproduction device located in a predetermined range base on the control device;

a reproduction device designating unit configured to designate at least one reproduction device from among the plurality of reproduction devices determined to be located in the predetermined range by the predetermined-range determination unit; and a reproduction instruction unit configured to instruct the reproduction device of the plurality of reproduction units designated by the reproduction device designating unit to obtain the content retained by the content retaining device via the network, and to reproduce and display the content;

wherein the predetermined-range determination unit includes:

a wireless communication unit configured to perform wireless communication with the reproduction device of the plurality of reproduction devices via a base station;

a belonging destination identifying unit configured to identify the base station to which the control device currently belongs while performing the wireless communication via the wireless communication unit;

a base station information storing unit configured to preliminarily store base station information which associates the plurality of reproduction devices with base stations to which respective reproduction devices belong during the wireless communication, respectively; and a registered base station identifying unit configured to identify the base station which matches the base station identified by the belonging destination identifying unit, from among the base stations registered in the base station information, to which the reproduction devices belong, and wherein the predetermined-range determination unit determines the reproduction device of the plurality of reproduction devices corresponding to the base station identified by the registered base station identifying unit, to be located in the predetermined range, among the reproduction devices registered in the base station information.

8. A non-transitory computer-readable storage medium encoded with a computer program executed by a computer apparatus that causes a control device to control a content retaining device retaining content and a plurality of reproduction devices reproducing and displaying content supplied from the content retaining device, via a network, the computer program comprising:

program code for a predetermined-range determination process of determining a reproduction device located in a predetermined range based on the computer, from among a plurality of reproduction devices reproducing and displaying content supplied from a content retaining device retaining the content;

program code for a reproduction device designating process of designating at least one reproduction device from among the plurality of reproduction devices which are determined to be located in the predetermined range by the predetermined-range determination process; and program code for a reproduction instruction process of instructing the reproduction device designated by the reproduction device designating process to obtain the content retained by the content retaining device via a network and to reproduce and display the content;

wherein the predetermined-range determination process includes:

a wireless communication process of performing wireless communication with the reproduction device of the plurality of reproduction devices via a base station;

a belonging destination process of identifying the base station to which the control device currently belongs while performing the wireless communication via the wireless communication process;

a base station information process of preliminarily storing base station information which associates the plurality of reproduction devices with base stations to which respective reproduction devices belong during the wireless communication, respectively; and a registered base station process of identifying the base station which matches the base station identified by the belonging destination process, from among the base stations registered in the base station information, to which the reproduction devices belong, and wherein the predetermined-range determination process determines the reproduction device of the plurality of reproduction devices corresponding to the base station identified by the registered base station process, to be located in the predetermined range, among the reproduction devices registered in the base station information.

9. A reproduction system comprising a content retaining device configured to retain content, a plurality of reproduction devices configured to reproduce and display content supplied from the content retaining device, and a control device configured to control the content retaining device and the plurality of reproduction devices, connected with one another via a network, wherein the control device includes:

a predetermined-range determination unit configured to determine the reproduction device located in a predetermined range base on the control device;

a reproduction device designating unit configured to designate at least one reproduction device from among the plurality of reproduction devices determined to be located in the predetermined range by the predetermined-range determination unit; and a reproduction instruction unit configured to instruct the reproduction device of the plurality of reproduction units designated by the reproduction device designating unit to obtain the content retained by the content retaining device via the network, and to reproduce and display the content;

wherein each of the content retained by the content retaining device includes content attribute information indicating an attribute owned by the content;

wherein the reproduction device designating unit includes:

an association information storing unit configured to preliminarily store association information associating a plurality of attributes for classifying the content with the plurality of reproduction devices configured to reproduce and display the content having these attributes by priority, respectively;

an attribute information acquiring unit configured to acquire the content attribute information via the network; and a reproduction device identifying unit configured to identify the reproduction device of the plurality of reproduction devices corresponding to the attribute indicated by the content attribute information acquired by the attribute information acquiring unit, in the association information, and wherein the reproduction device designating unit designates the reproduction device of the plurality of reproduction devices identified by the reproduction device identifying unit.

10. A non-transitory computer-readable storage medium encoded with a computer program executed by a computer apparatus that causes a control device to control a content retaining device retaining content and a plurality of reproduction devices reproducing and displaying content supplied from the content retaining device, via a network, the computer program comprising:

program code for a predetermined-range determination process of determining a reproduction device located in a predetermined range based on the computer, from among the plurality of reproduction devices reproducing and displaying content supplied from a content retaining device retaining the content;

program code for a reproduction device designating process of designating at least one reproduction device from among the plurality of reproduction devices which are determined to be located in the predetermined range by the predetermined-range determination process; and program code for a reproduction instruction process of instructing the reproduction device designated by the reproduction device designating process to obtain the content retained by the content retaining device via a network and to reproduce and display the content;

wherein each of the content retained by the content retaining device includes content attribute information indicating an attribute owned by the content;

wherein the reproduction-device designating process includes:

an association information process of preliminarily storing association information associating a plurality of attributes for classifying the content with the plurality of reproduction devices configured to reproduce and display the content having these attributes by priority, respectively;

an attribute information acquiring process of acquiring the content attribute information via the network; and a reproduction device process of identifying the reproduction device of the plurality of reproduction devices corresponding to the attribute indicated by the content attribute information acquired by the attribute information acquiring process, in the association information, and wherein the reproduction-device designating process designates the reproduction device of the plurality of reproduction devices identified by the reproduction device process.

* * * * *